US012278685B2

(12) United States Patent
Jacob et al.

(10) Patent No.: US 12,278,685 B2
(45) Date of Patent: Apr. 15, 2025

(54) REPEATER SYSTEM

(71) Applicant: Telefonaktiebolaget LM Ericsson (publ), Stockholm (SE)

(72) Inventors: Martin Jacob, Rosenheim (DE); Alexander Seeor, Kolbermoor (DE); Maximilian Göttl, Frasdorf (DE); Frieso Damm, Rosenheim (DE); Andreas Tscherner, Prien am Chiemsee (DE); Markus Mohr, Rosenheim (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 81 days.

(21) Appl. No.: 17/432,915

(22) PCT Filed: Feb. 21, 2020

(86) PCT No.: PCT/EP2020/054663
§ 371 (c)(1),
(2) Date: Aug. 21, 2021

(87) PCT Pub. No.: WO2020/169823
PCT Pub. Date: Aug. 27, 2020

(65) Prior Publication Data
US 2022/0200690 A1    Jun. 23, 2022

(30) Foreign Application Priority Data
Feb. 21, 2019 (DE) ............ 10 2019 104 458.8

(51) Int. Cl.
*H04B 7/155* (2006.01)
*H04B 1/00* (2006.01)
*H04B 7/024* (2017.01)

(52) U.S. Cl.
CPC ....... *H04B 7/15507* (2013.01); *H04B 1/0071* (2013.01); *H04B 7/024* (2013.01); *H04B 7/15528* (2013.01)

(58) Field of Classification Search
None
See application file for complete search history.

(56) References Cited

U.S. PATENT DOCUMENTS 4,357,583 A * 11/1982 Martel ............... H03G 11/025
                                                                333/252
6,374,119 B1 * 4/2002 Jun .................... H04B 7/2606
                                                                455/523

(Continued)

FOREIGN PATENT DOCUMENTS

DE   102015011875 A1   3/2017
DE   102019104458 A1   8/2020

(Continued)

OTHER PUBLICATIONS

Author Unknown, "Technical Specification Group Radio Access Network; Study on new radio access technology; Radio Frequency (RF) and co-existence aspects (Release 14)," Technical Report 38.803, Version 14.2.0, 3GPP Organizational Partners, Sep. 2017, 205 pages.

(Continued)

*Primary Examiner* — Andrew C Oh
(74) *Attorney, Agent, or Firm* — Withrow & Terranova, PLLC

(57) ABSTRACT

The invention relates to a repeater system for forwarding radio signals. The repeater system comprises a donor unit for converting the frequencies of the radio signals from the transmission frequency to an intermediate frequency; a server unit for converting the converted radio signals from the intermediate frequency to the transmission frequency; and a cable, which connects the donor unit and the service (Continued)

Figure 1:
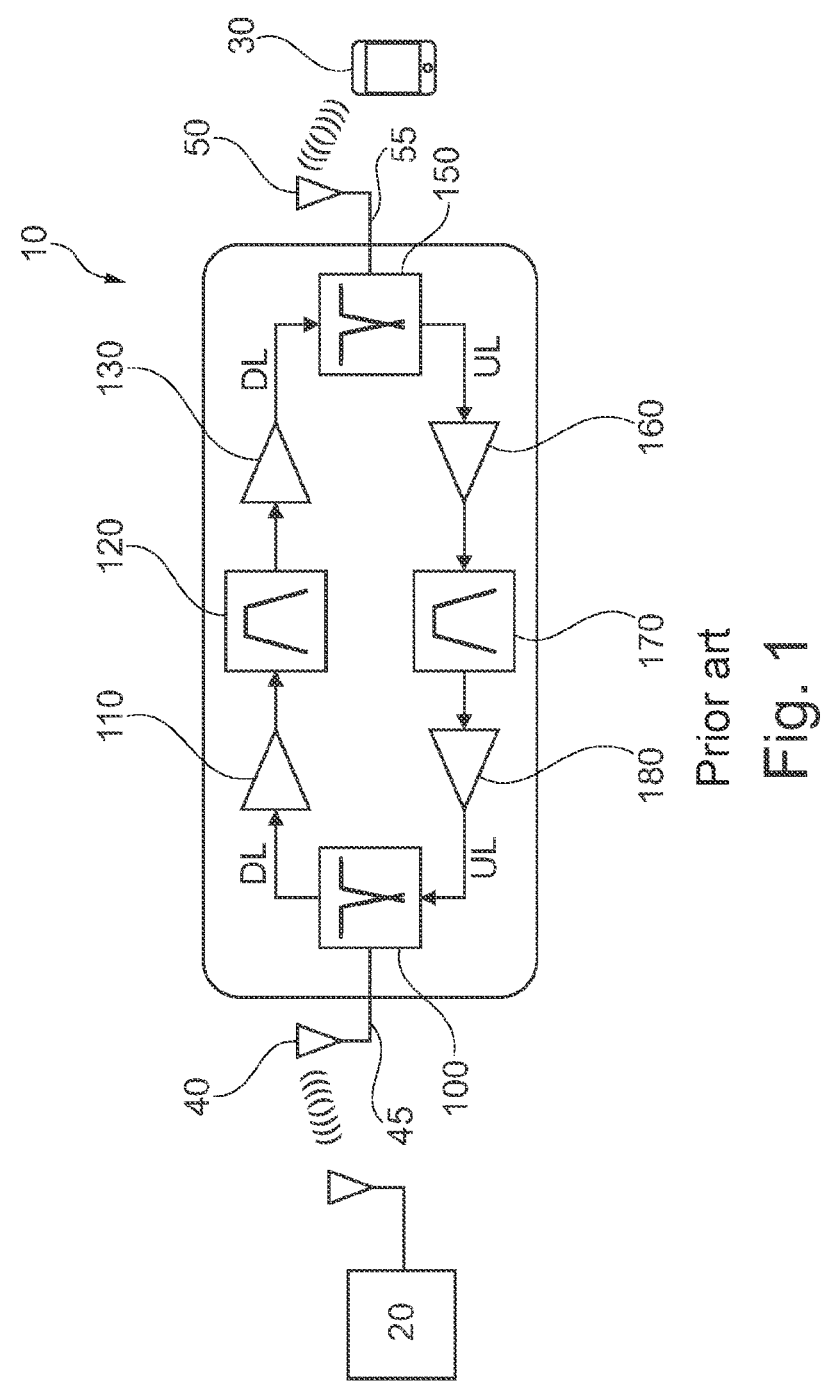

unit and transmits the converted radio signals over a distance between the donor unit and the service unit at the intermediate frequency. The donor unit has an uplink donor antenna and a separate downlink donor antenna and/or the service unit has an uplink service antenna and, at the same time, a separate downlink service antenna.

19 Claims, 31 Drawing Sheets

(56) References Cited

U.S. PATENT DOCUMENTS

| | | | |
|---|---|---|---|
| 6,445,904 B1* | 9/2002 | Lovinggood | H01Q 1/007 455/562.1 |
| 7,577,398 B2 | 8/2009 | Judd et al. | |
| 2002/0039885 A1 | 4/2002 | Weissman et al. | |
| 2004/0110469 A1* | 6/2004 | Judd | H01Q 21/061 455/562.1 |
| 2006/0205342 A1* | 9/2006 | McKay, Sr. | H04B 3/36 455/11.1 |
| 2009/0323582 A1* | 12/2009 | Proctor, Jr. | H04B 7/0617 455/7 |
| 2010/0029350 A1* | 2/2010 | Zhang | H04B 1/40 455/575.7 |
| 2010/0177668 A1* | 7/2010 | Ahn | H04B 7/15585 370/279 |
| 2010/0273415 A1* | 10/2010 | Almgren | H04B 7/15514 455/7 |
| 2012/0188919 A1* | 7/2012 | Subasic | H04B 7/15578 370/279 |
| 2012/0243447 A1* | 9/2012 | Weissman | H04B 1/0458 370/280 |
| 2013/0271135 A1* | 10/2013 | Ozen | G01R 33/3657 324/309 |
| 2016/0359506 A1* | 12/2016 | Ellae | H04B 1/52 |
| 2018/0138967 A1 | 5/2018 | Ashworth et al. | |
| 2018/0152244 A1* | 5/2018 | Cho | H04B 10/25753 |
| 2019/0020401 A1 | 1/2019 | Gharavi et al. | |
| 2019/0199381 A1* | 6/2019 | Haun | H04B 1/3822 |
| 2019/0253129 A1 | 8/2019 | Pyun et al. | |
| 2020/0204249 A1* | 6/2020 | Pyun | H04B 7/26 |

FOREIGN PATENT DOCUMENTS

| | | | |
|---|---|---|---|
| EP | 1224821 B1 | 8/2008 | |
| JP | H07297751 A * | 11/1995 | |
| JP | 2002353845 A * | 12/2002 | |
| JP | 2008199551 A * | 8/2008 | |
| KR | 2004092621 A * | 11/2004 | H04B 7/02 |
| KR | 20040092621 A * | 11/2004 | |
| KR | 20120106474 A * | 9/2012 | |
| KR | 20190006392 A | 1/2019 | |
| RU | 2358277 C1 * | 6/2009 | |
| WO | 9854844 | 12/1998 | |
| WO | WO-9900918 A1 * | 1/1999 | H04B 7/2643 |
| WO | WO-2011089860 A1 * | 7/2011 | H04B 7/15535 |
| WO | 2018009035 A1 | 1/2018 | |
| WO | WO-2018199461 A1 * | 11/2018 | H04B 10/25759 |

OTHER PUBLICATIONS

Author Unknown, "Technical Specification Group Radio Access Network; UTRA repeater radio transmission and reception (Release 15)," Technical Specification 25.106, Version 15.0.0, 3GPP Organizational Partners, Jun. 2018, 45 pages.

Author Unknown, "Technical Specification Group Radio Access Network; Base Station (BS) and repeater ElectroMagnetic Compatibility (EMC) (Release 15)," Technical Specification 25.113, Version 15.0.0, 3GPP Organizational Partners, Mar. 2018, 33 pages.

Author Unknown, "Technical Specification Group Radio Access Network; UTRA repeater radio transmission and reception (LCR TDD) (Release 15)," Technical Specification 25.116, Version 15.0.0, 3GPP Organizational Partners, Jun. 2018, 26 pages.

Author Unknown, "Technical Specification Group Radio Access Network; UTRA repeater conformance testing (Release 15)," Technical Specification 25.143, Version 15.0.0, 3GPP Organizational Partners, Jun. 2018, 80 pages.

Author Unknown, "Technical Specification Group Radio Access Network; UTRA repeater conformance testing (LCR TDD) (Release 15)," Technical Specification 25.153, Version 15.0.0, 3GPP Organizational Partners, Sep. 2018, 50 pages.

Author Unknown, "Technical Specification Group Radio Access Network; Evolved Universal Terrestrial Radio Access (E-UTRA); FDD Repeater radio transmission and reception (Release 15)," Technical Specification 36.106, Version 15.0.0, 3GPP Organizational Partners, Dec. 2017, 54 pages.

Author Unknown, "Technical Specification Group Radio Access Network; Evolved Universal Terrestrial Radio Access (E-UTRA); Relay radio transmission and reception (Release 15)," Technical Specification 36.116, Version 15.0.0, 3GPP Organizational Partners, Sep. 2018, 34 pages.

Author Unknown, "Technical Specification Group Radio Access Network; Evolved Universal Terrestrial Radio Access (E-UTRA); Relay conformance testing (Release 15)," Technical Specification 36.117, Version 15.0.0, 3GPP Organizational Partners, Sep. 2018, 60 pages.

Author Unknown, "Technical Specification Group Radio Access Network; Evolved Universal Terrestrial Radio Access (E-UTRA); Physical layer for relaying operation (Release 15)," Technical Specification 36.216, Version 15.0.0, 3GPP Organizational Partners, Jun. 2018, 16 pages.

Author Unknown, "Coaxial cable," Wikipedia, last edited Aug. 18, 2021, retrieved Aug. 19, 2021, accessible at https://en.wikipedia.org/wiki/Coaxial_cable, 15 pages.

Rappaport, Theodore S., et al., "Millimeter Wave Mobile Communications for 5G Cellular: It Will Work!" IEEE Access, vol. 1, May 10, 2013, pp. 335-349.

Examination Report for German Patent Application No. 102019104458.8, mailed Oct. 22, 2019, 20 pages.

International Search Report and Written Opinion for International Patent Application No. PCT/EP2020/054663, mailed May 12, 2020, 21 pages.

Examination Report for European Patent Application No. 20706499.9, mailed Nov. 10, 2023, 11 pages.

* cited by examiner

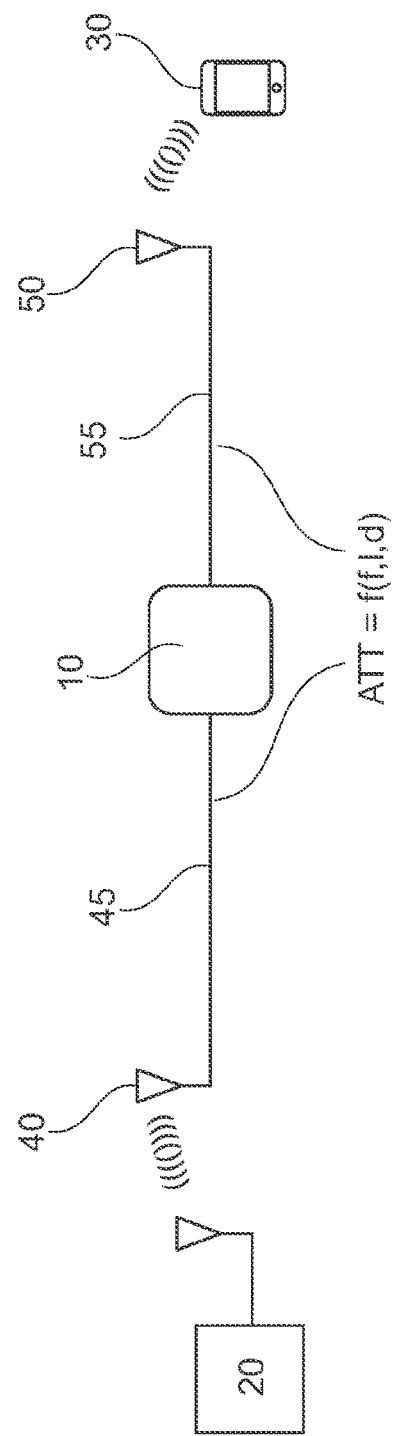

REPEATER SYSTEM

This application is a 35 U.S.C. § 371 national phase filing of International Application No. PCT/EP2020/054663, filed Feb. 21, 2020, which claims the benefit of German Application No. DE 10 2019 104 458.8, filed Feb. 21, 2019, the disclosures of which are incorporated herein by reference in their entireties.

The invention relates to a repeater for forwarding radio signals

In order to meet the demand for ever greater data rates in wireless networks, frequencies in the millimeter wave range are also currently being investigated and it is already certain that these frequencies will be used in the LTE successor standard (5G). Application areas for these frequencies range from fixed wireless access (FWA) to typical mobile networks.

Mobile radio network coverage in the millimeter wave range is more limited than at conventional mobile radio frequencies. For example, free-space attenuation at 28 GHz is 20 to 30 dB higher than at conventional mobile radio frequencies. In addition, there are significantly higher propagation losses due to vegetation and high penetration losses of building materials such as glass and concrete. To make matters worse, propagation around house corners or over rooftops is not possible in this frequency range due to high diffraction losses (see "Millimeter Wave Mobile Communications for 5G Cellular: It Will Work!" by Theodore S. Rappaport et al, IEEE Access, vol. 1, pp. 335-349, 10 May 2013).

Furthermore, the performance of available analog hardware is limited (see 3GPP Technical Report No. 38.803—v 14.2.0 of September 2017). In this context, the radiated power at the transmitter side is particularly limited by the efficiency of the power amplifier. On the receiving side, high line losses and the available LNA (low-noise amplifier) technology limit the noise figure. As a result, an area-wide network has to be built up more closely, which leads to increased costs (CAPEX and OPEX).

One solution to increase network coverage cost-efficiently is the use of repeaters or relay/forwarding technologies. Repeater functionality is already known from GSM, UMTS and LTE networks (see 3GPP Technical Specifications TS 25.106, 25.107, 25.113, 25.116, 25.143, 25.153, 36.106). In the course of the development of LTE-A, so-called relay nodes were also introduced in 3GPP Release 10 (3GPP TS 36.116, 36.117, 36.216).

In light of the above, a solution for the network coverage problem also in the millimeter wave range and future mobile communications standards with the aid of repeaters is desirable. However, precisely because of the restrictions described above, concrete solutions pose a particular technical challenge that cannot be met with the current state of the art.

Repeaters for forwarding radio signals are known in the prior art. The repeater receives radio signals from a transmitter at a transmission frequency from one direction, amplifies the signals, and radiates the received radio signals in another direction. An example of such a repeater is shown in U.S. Pat. No. 7,577,398 B2 (Andrews LLC), which discloses a repeater having a housing with two opposing surfaces. At least one antenna is mounted on each of the two opposing surfaces, and the antennas radiate radio signals in opposite directions. A circuit is provided within the housing to forward signals between one of the antennas and the other antenna.

The repeater system of this document is suitable, for example, for supplying the inner areas of a building. Several patent documents are known for supplying radio networks inside buildings. For example, U.S. Pat. No. 6,374,119 B1 (Jun et al), International Patent Application No. WO 98/54844 (LGC Wireless), European Patent No. EP 1 224 821 B1 (Qualcomm), and German Patent application No. DE 10 2015 011 875 A1 (Kathrein) show such a system.

Figure 2:
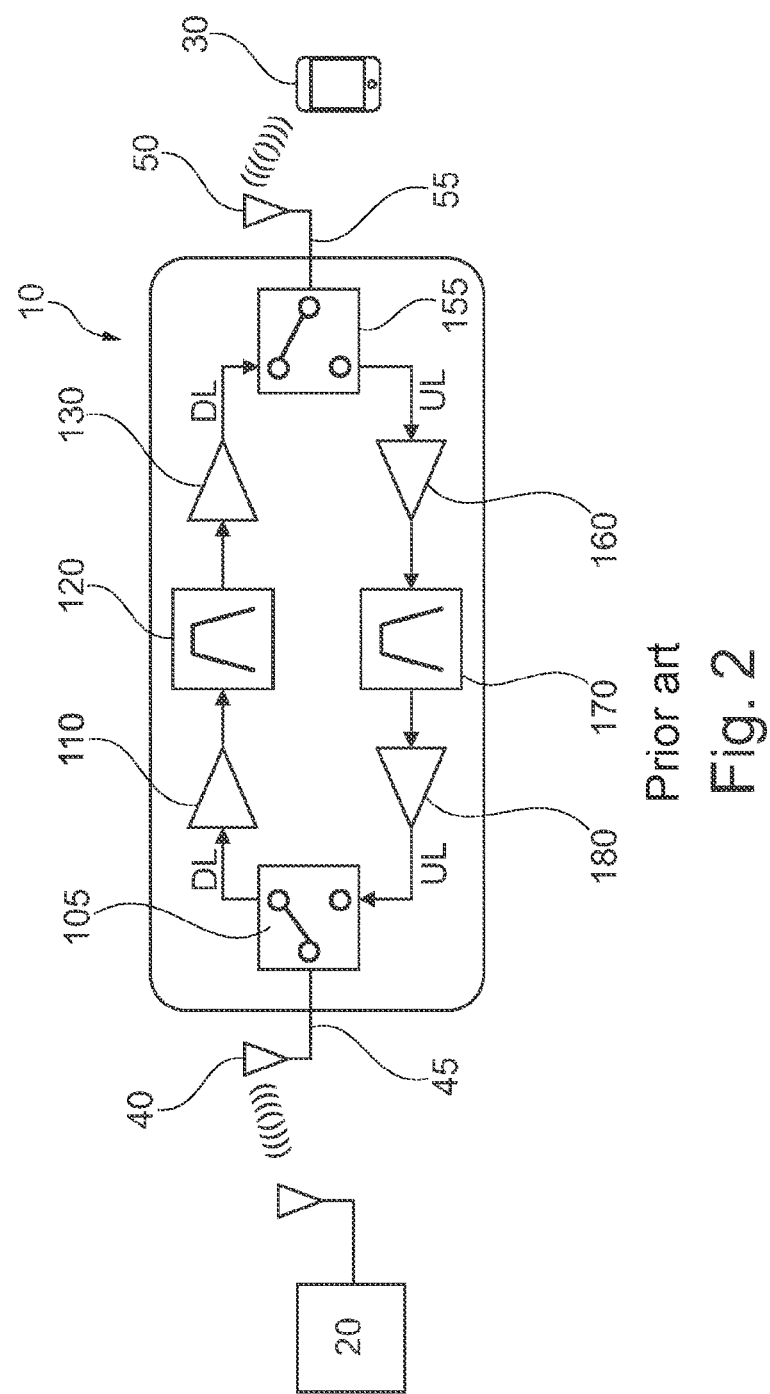

FIGS. 1 and 2 illustrate the typical structure of prior art repeater solutions. The repeater 10 has a donor antenna 40 and a service antenna 50. The donor antenna 40 receives signals from a base station 20 and the service antenna 50 transmits radio signals to a mobile station 30, such as a smartphone or tablet. The donor antennas 40 and the service antennas 50 connected to the repeater 10 can be installed more or less far away from the repeater 10 depending on the given situation at the installation site.

In such cases, the donor antennas 40 and the service antennas 50 are connected to the repeater 10 via coaxial lines 45 and 55. The used coaxial lines 45 and 55 are known to have a frequency-dependent signal attenuation which increases with increasing frequencies and cable length (see https://de.wikipedia.org/wiki/Koaxialkabel).

The repeater itself includes two transmission paths. The upper transmission path in these figures includes a low-noise downlink amplifier 110, a downlink bandpass filter 120, and a downlink power amplifier 130 in a downlink (DL) path. The lower transmission path is the uplink (UL) path and includes a low-noise uplink amplifier 160, an uplink bandpass filter 170, and an uplink power amplifier 180. The donor antenna 40 is connected to a first duplexer 100 that selects the downlink path or the uplink path via filter separation in a frequency division duplex (FDD) operation. The service antenna 50 is connected to a second duplexer 150, which also selects between the downlink path and the uplink path via a filter function in FDD operation.

FIG. 2 illustrates a similar prior art embodiment, wherein this embodiment is a time division duplex implementation. Here, the first duplexer 100 is replaced by a first switch 105 and the second duplexer 150 is replaced by a second switch 155. The other components are the same as the elements in FIG. 1 and have the same reference signs.

FIG. 3 shows in a very simplified way where in the system the signal attenuation (ATT) of the coaxial lines 45, 55 comes into play as a function of frequency (f) and cable length (l). The signal attenuation further scales with the diameter of the cable used in the coaxial lines 45, 55. As is known, the attenuation of the coaxial lines increases with decreasing diameter (d). These line-borne losses are, for example, approximately 160 dB/100 m at a line frequency of 28 GHz. With a typical repeater amplification of 50 dB, a total cable length of approx. 32 m from the donor antenna 40 to the repeater 10 and further to the service antenna 50, the entire signal amplification is already attenuated back to the level received at the donor antenna. An installation of a repeater system that is advantageous in terms of signal amplification, such as is common on building roofs and at road intersections, cannot be carried out in this way, or can only be carried out to a limited extent.

The invention is therefore based on the object of developing an improved repeater system. The repeater system comprises a donor unit for converting the frequencies of the radio signals from the transmission frequency to an intermediate frequency, at least one server unit for converting the converted radio signals from the intermediate frequency to the transmission frequency, and at least one cable connecting the donor unit and the service unit and transmitting the converted radio signals over a distance between the donor unit and the service unit on the intermediate frequency. In the repeater system embodiment according to the invention, at least the donor unit comprises an uplink donor antenna and a separate separate downlink donor antenna and/or the service unit comprises an uplink service antenna and a separate downlink service antenna at the same time.

Antenna separation is not known in the prior art for a repeater transmitting radio signals in TDD mode. As known from FIG. 2, repeaters in a TDD design require several switches to switch the antennas between the signals on the transmission paths (uplink path and downlink path). These switches cause significant insertion loss in the centimeter and millimeter wave range, which is very detrimental to the overall performance of the repeater system. However, the repeater system of this document does not have an internal synchronization signal to control the switches and this synchronization signal would otherwise have to be generated from the received radio signals. The separate antennas eliminate the need for the derivation or generation of the synchronization signals.

According to the 5G standard, the frames in a radio signal do not have a fixed timing pattern and therefore do not have a predefined frame length, which also makes switching between the transmission paths and thus synchronization of the radio signals even more difficult with a single, split donor antenna. Separating the antennas also avoids delaying the transmission of the signals due to the switching times for the switches that would otherwise be required, as well as the derivation of the synchronization signal. Beamsteering used in 5G transmissions can be considered an additional challenge for synchronization, since this means that the signals from the base station are not always available, but only when the beam is currently pointing at the repeater system (10).

In one aspect, the repeater system comprises further service units and a plurality of cables, each connecting the donor unit and the further of the service units and transmitting the converted radio signals over a distance between the donor unit and the connected further service units. These further service units are adapted, for example, in such a way that the service units radiate and receive radio signals in different directions and serve different, potentially overlapping sectors in order to provide largely complete coverage of the area being served. The service units can radiate and receive radio signals of different transmission frequencies during operation.

The decoupling between the uplink donor antenna and the downlink donor antenna should be at least 40 dB, and preferably 60 dB.

In another aspect of the repeater system, the amplification of the donor downlink amplifier is adjustable and is set such that the sum of the total amplification between the donor downlink antenna and service uplink antenna is less than the decoupling between the donor uplink antenna and the service downlink antenna. This avoids oscillations in the repeater system.

In order to reduce the power consumption of the repeater system, the amplification of the respective amplifiers of the downlink path in the donor unit and/or server unit in a TDD system may be turned off or reduced in amplification at the time when no desired signal is passing over that amplifier.

Figure 5A:
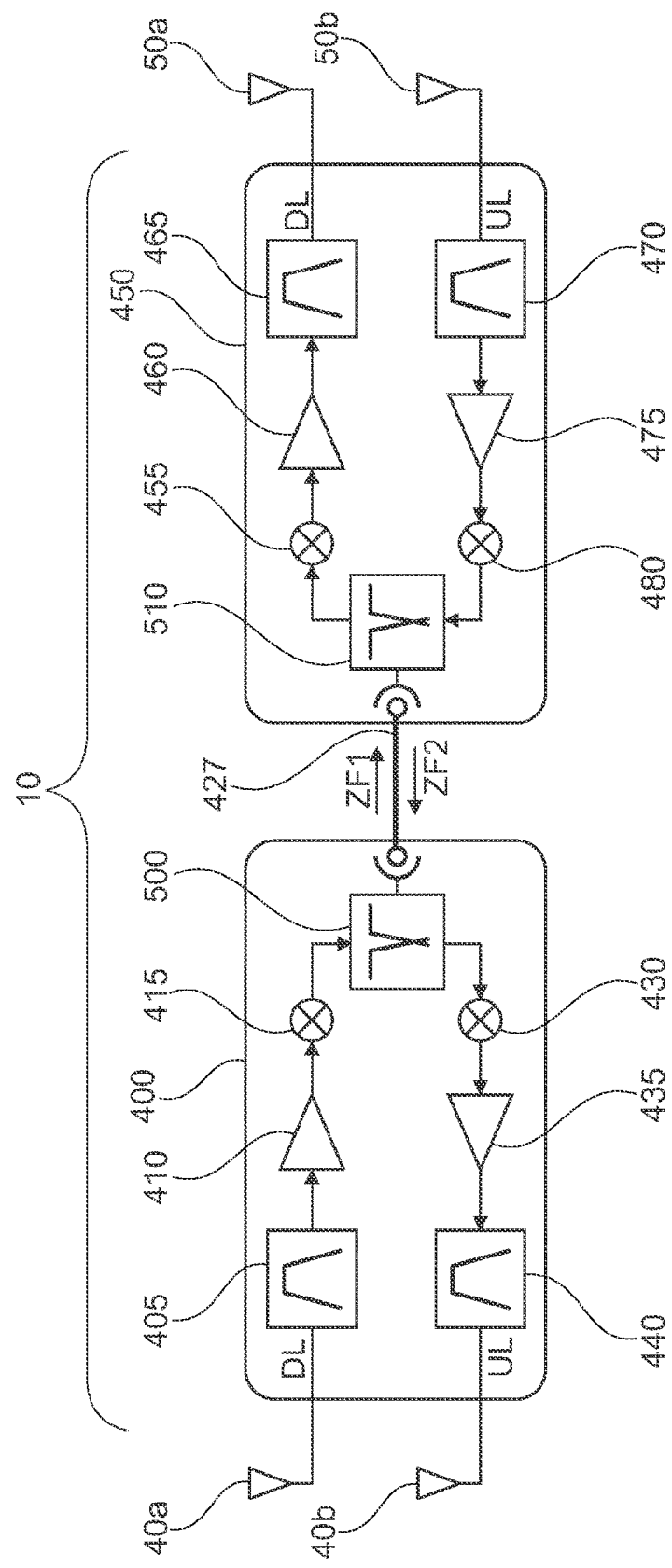
Figure 5B:
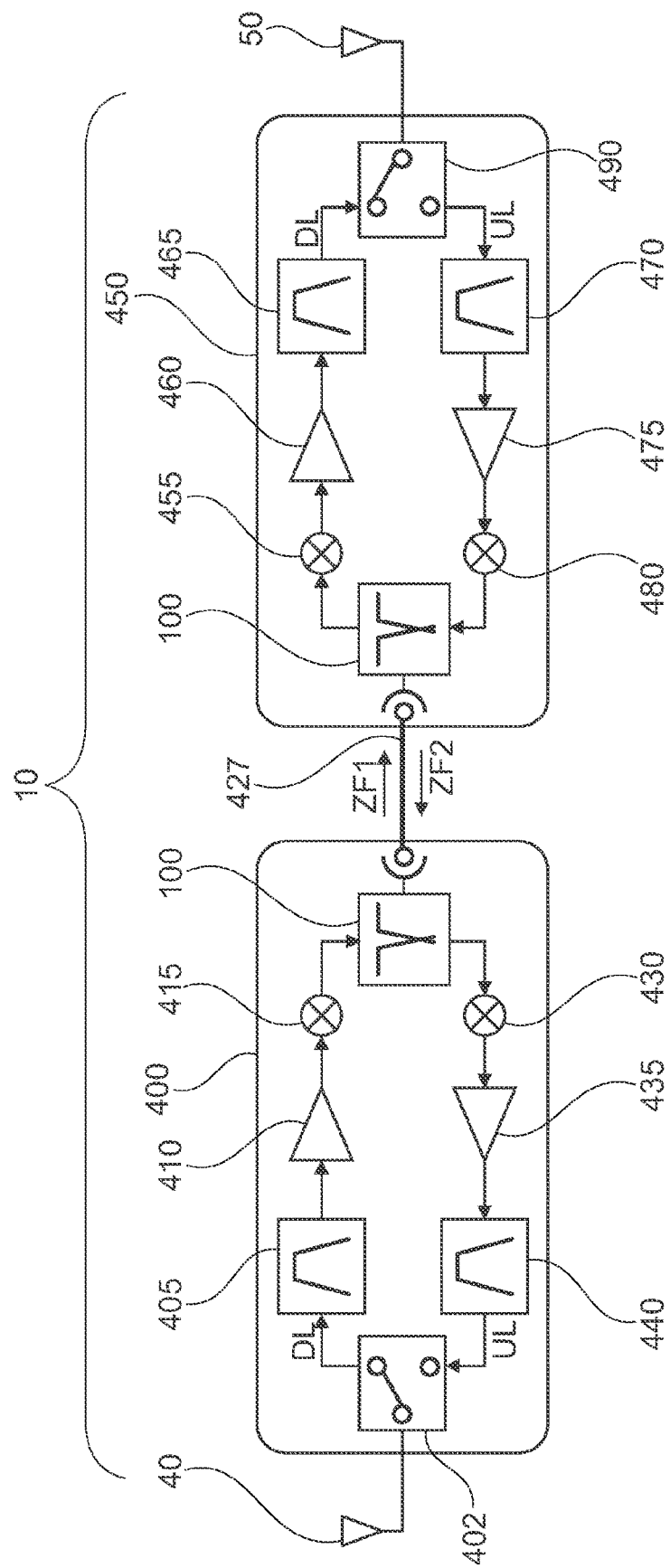
Figure 5C:
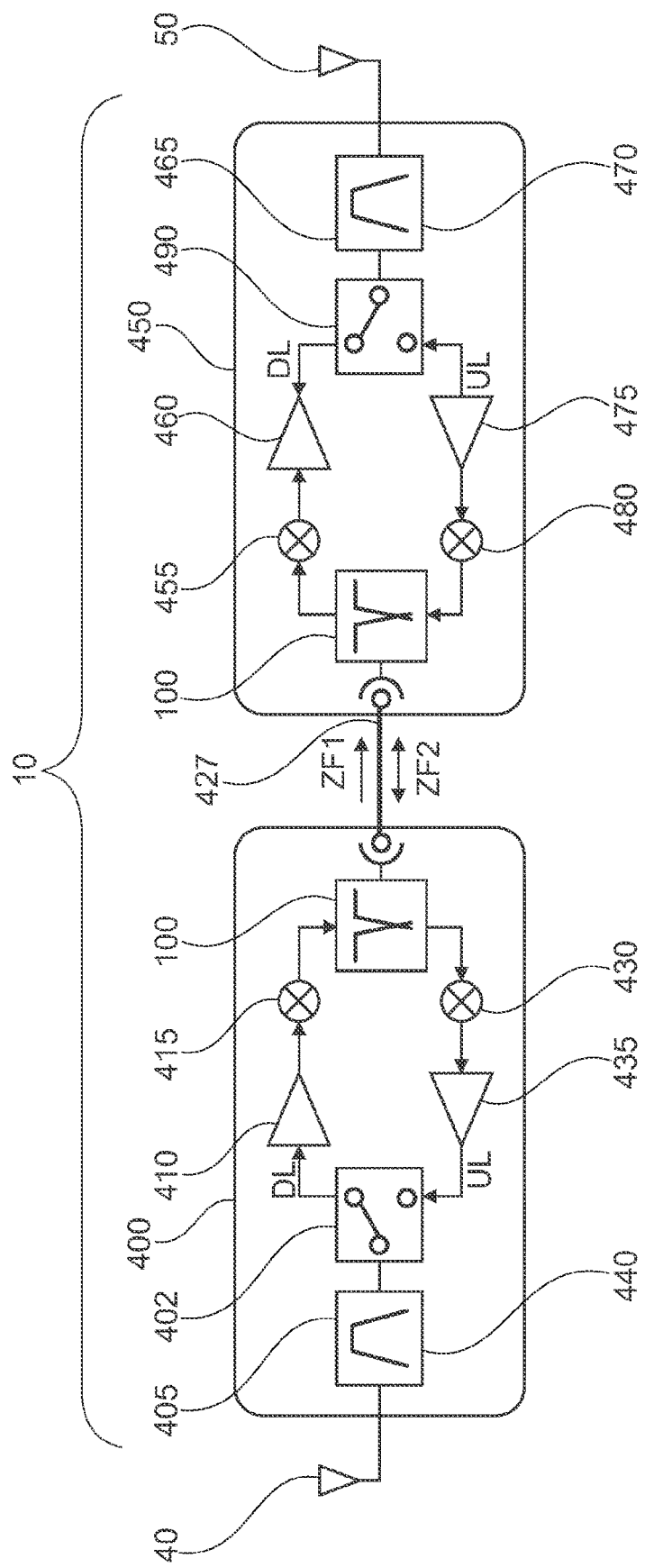
Figure 6:
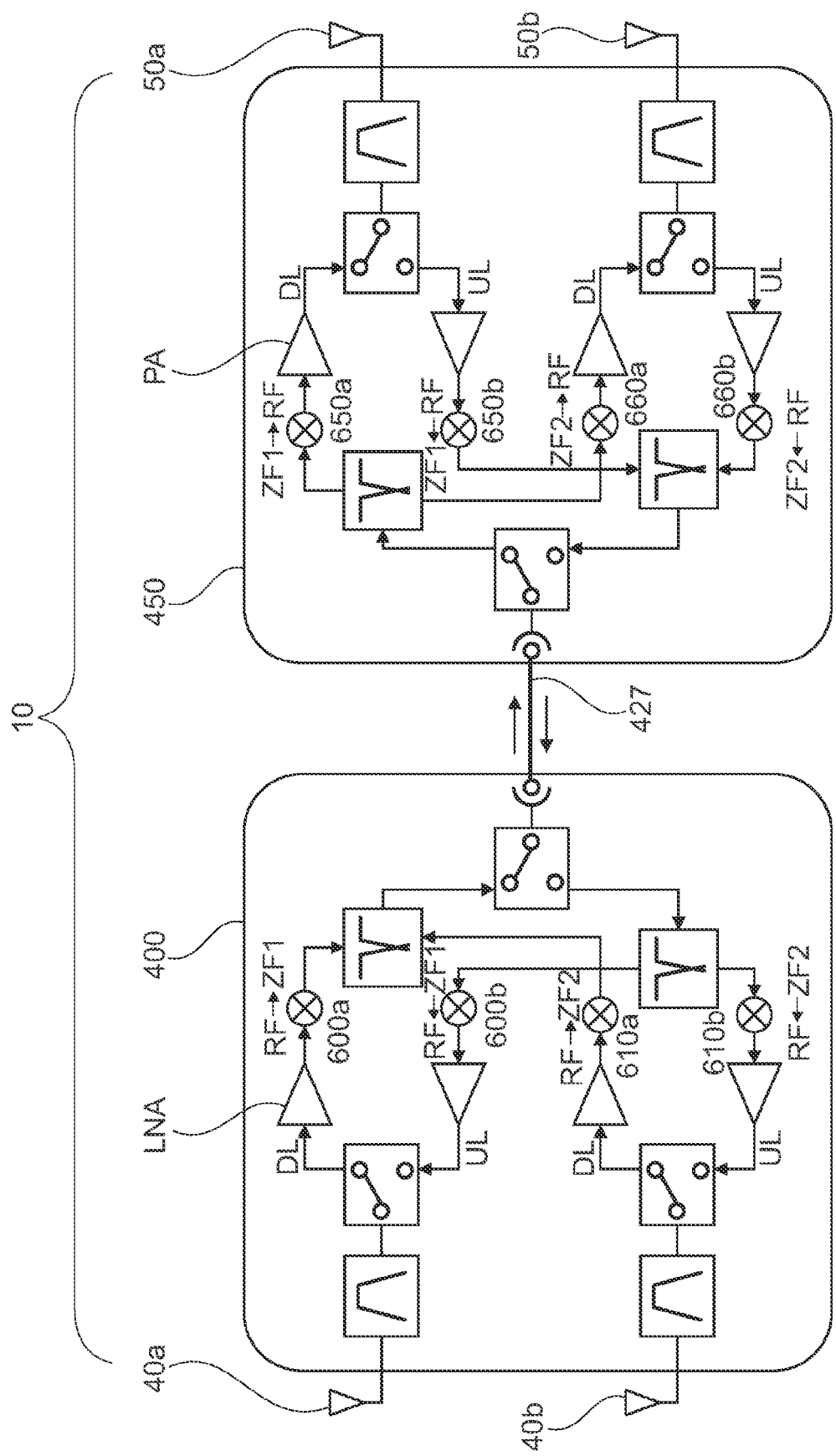
Figure 7:
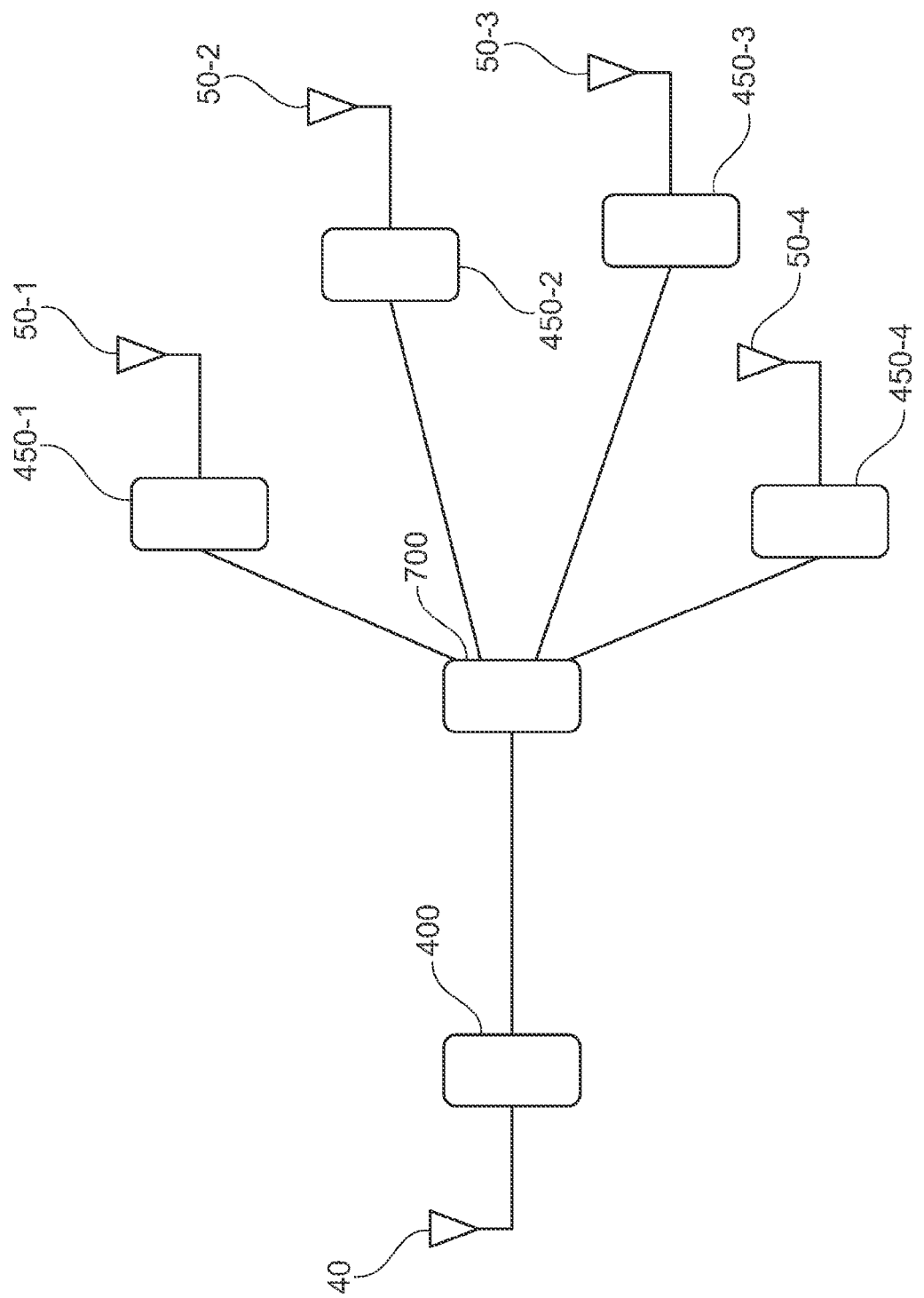
Figure 8A:
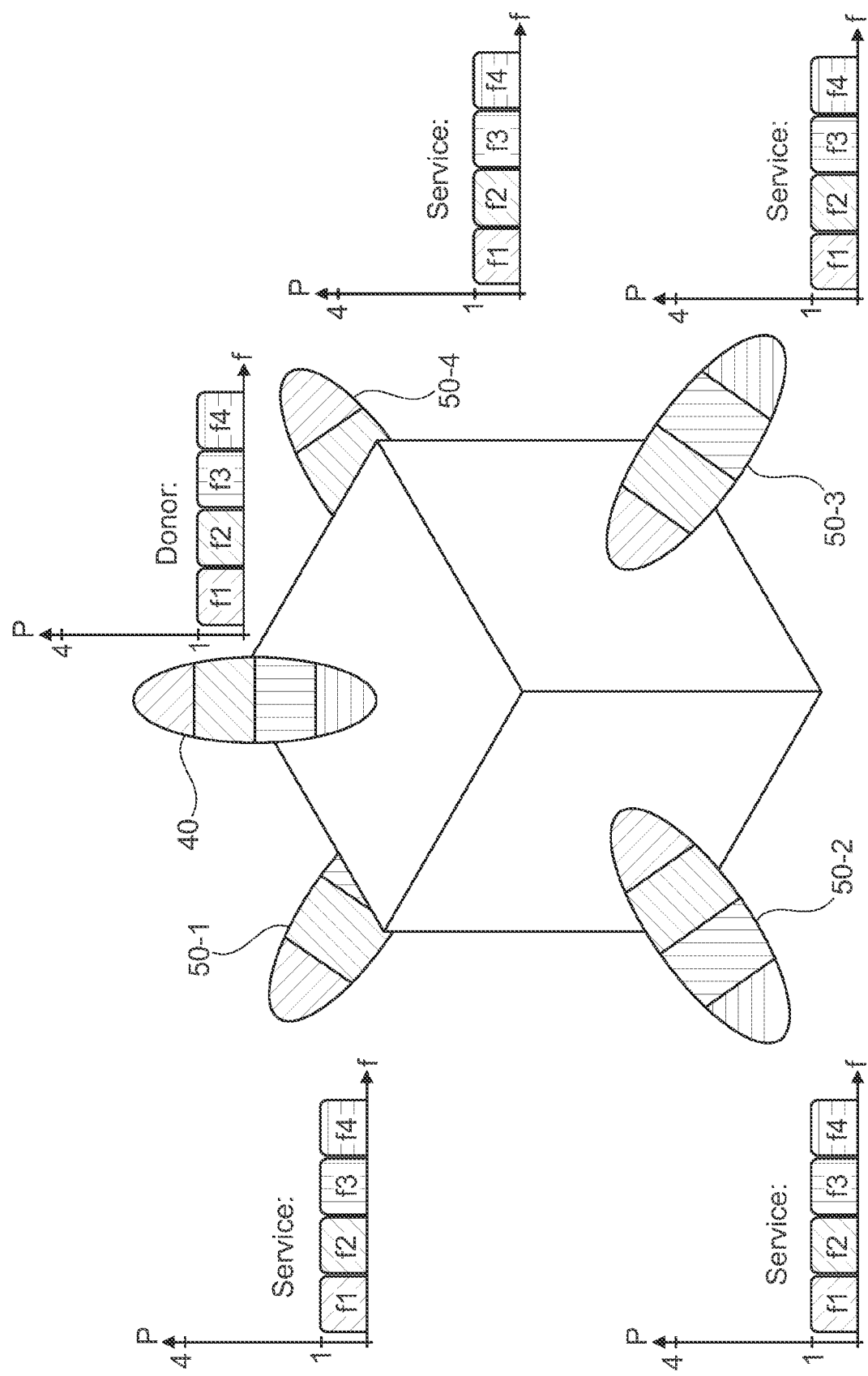
Figure 8B:
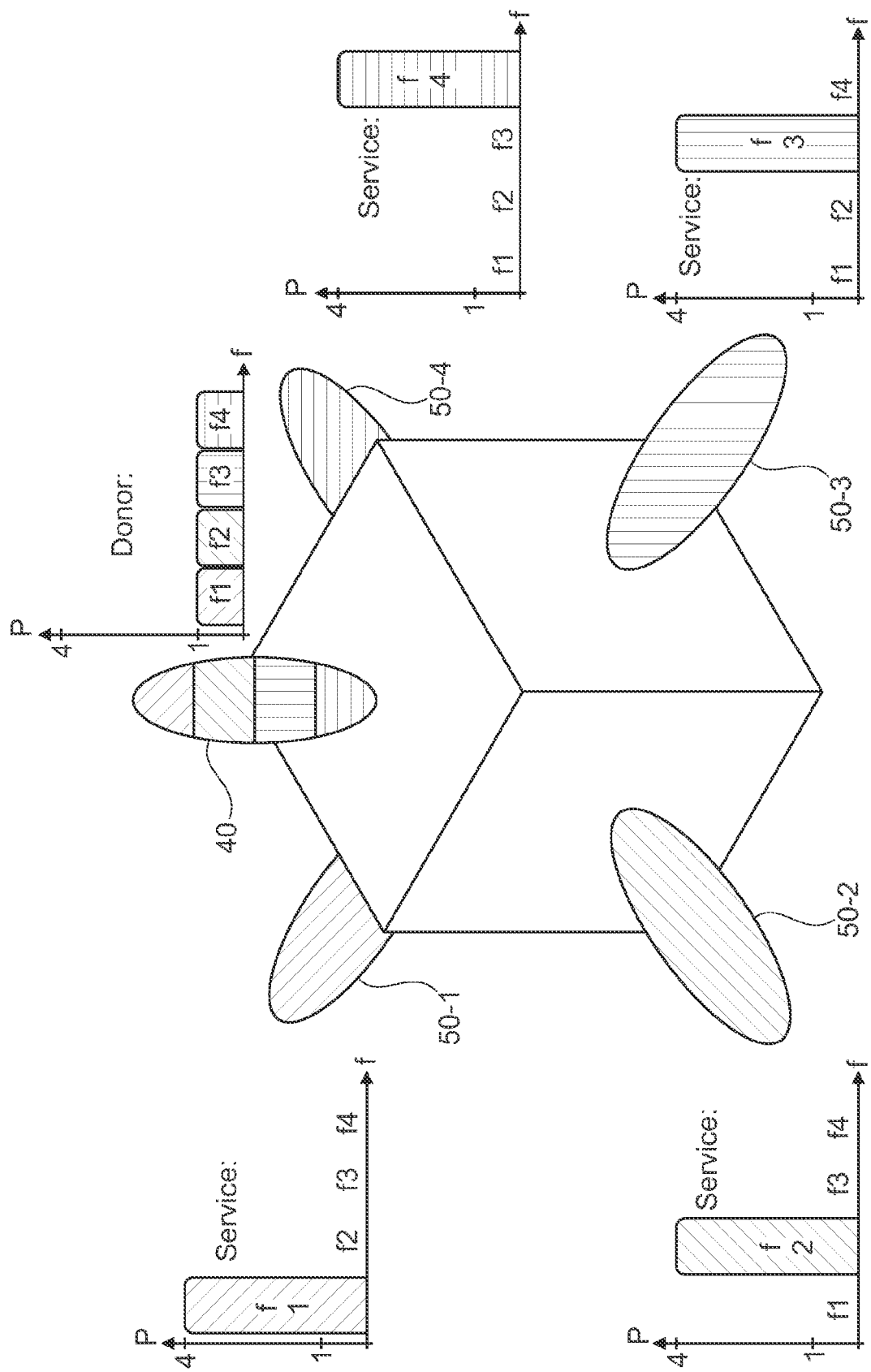
Figure 9A:
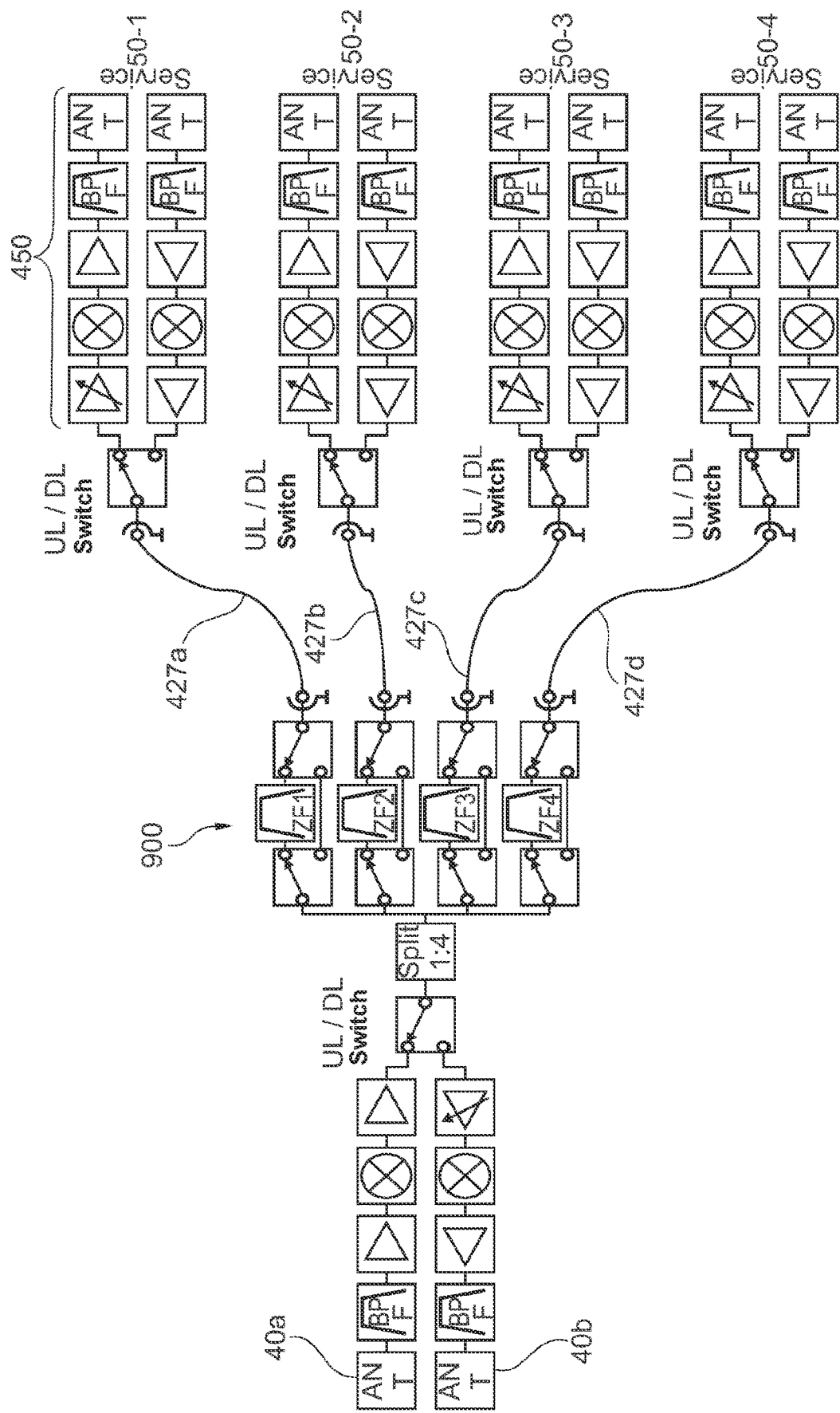
Figure 9B:
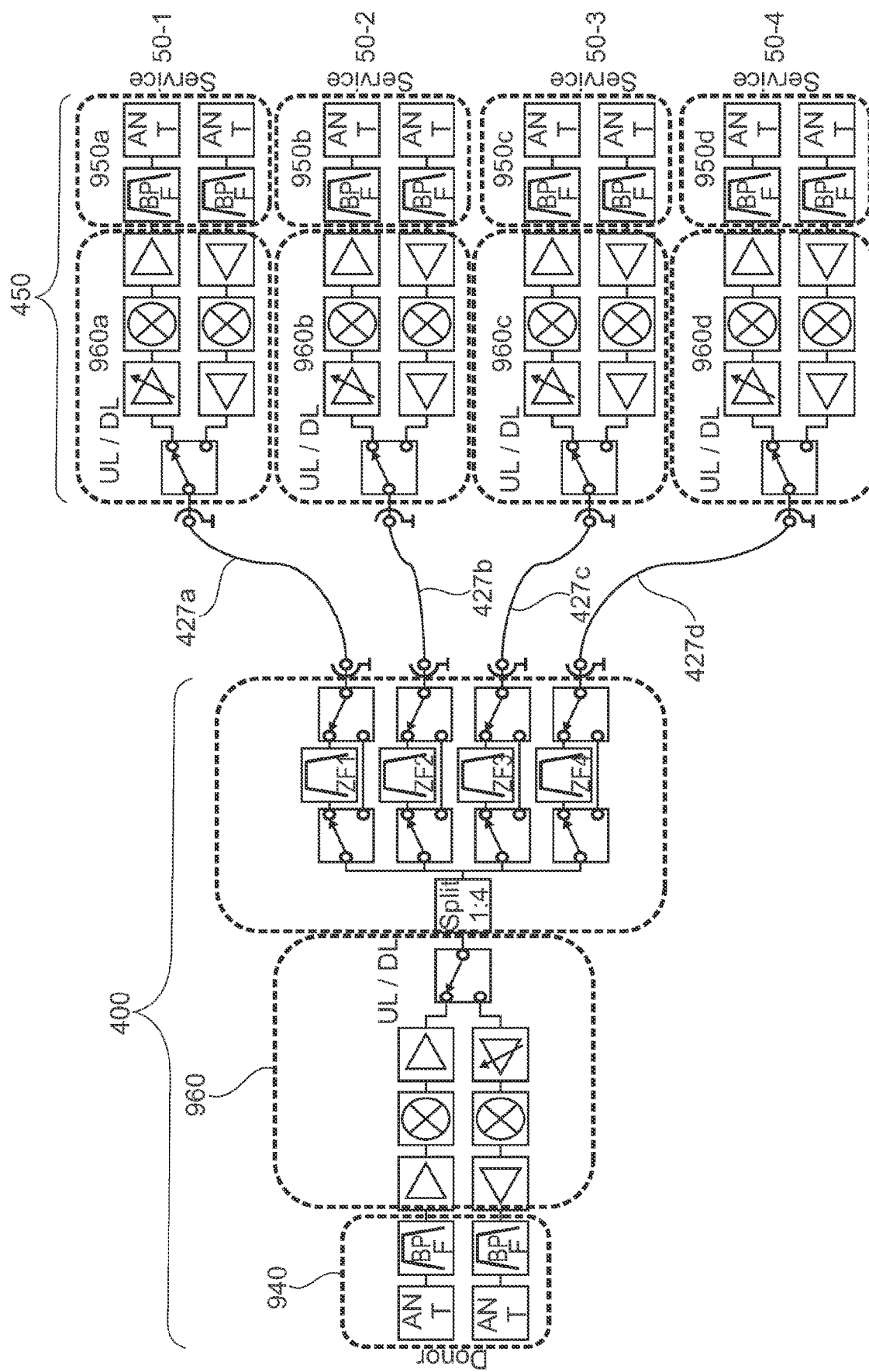
Figure 10:
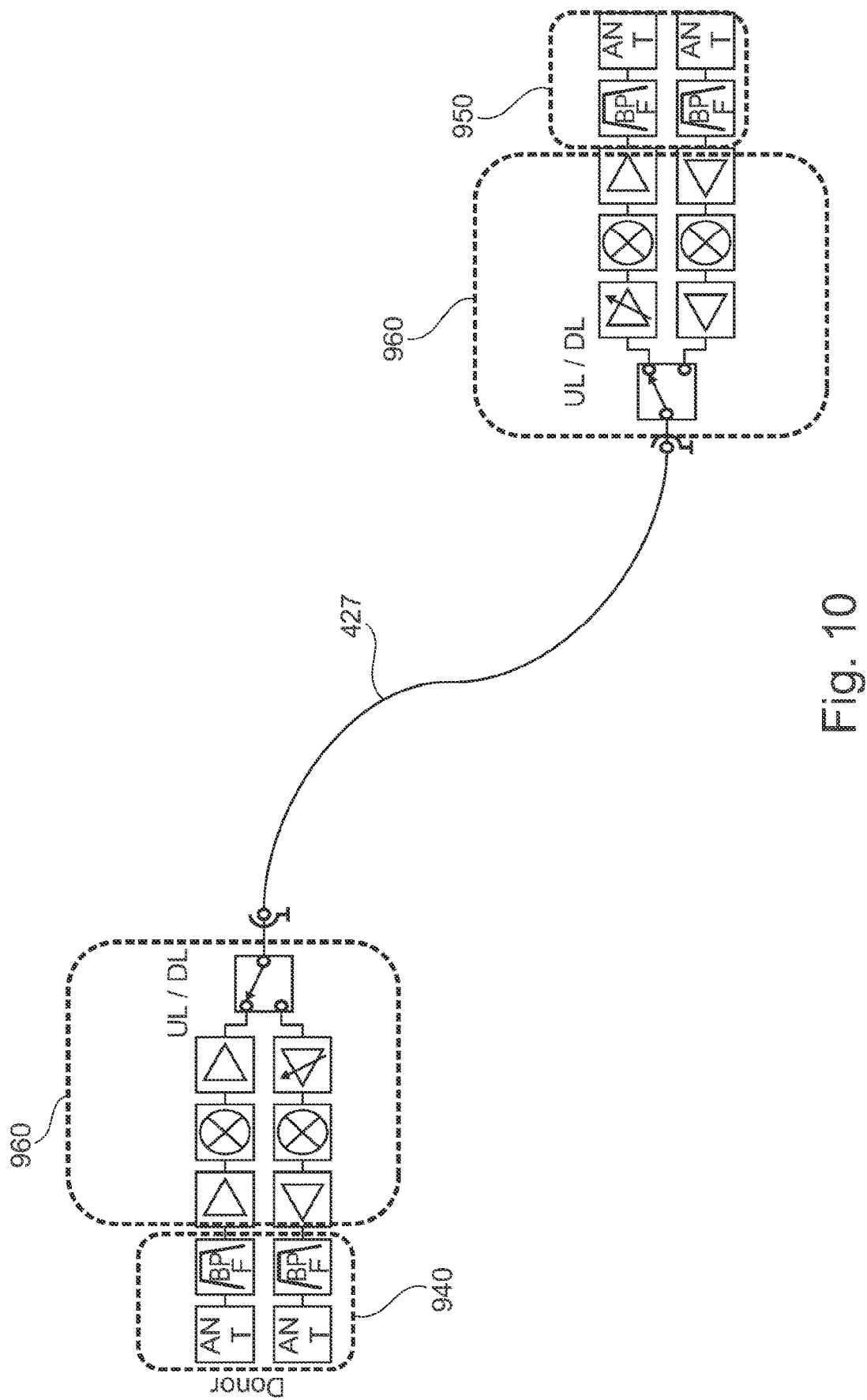
Figure 13:
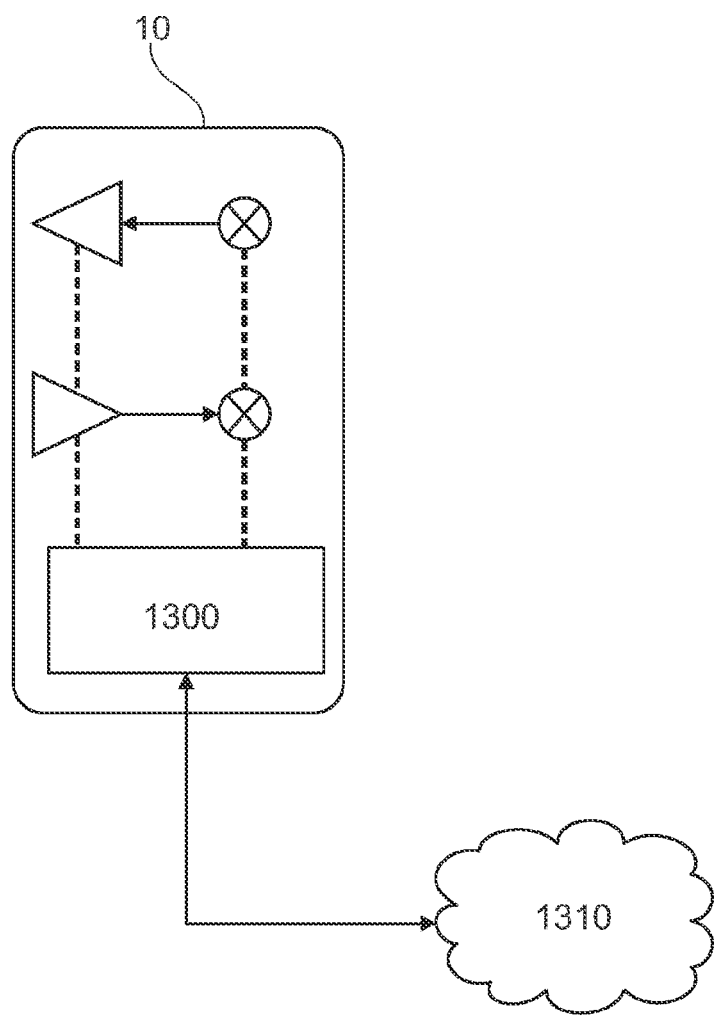
Figure 14:
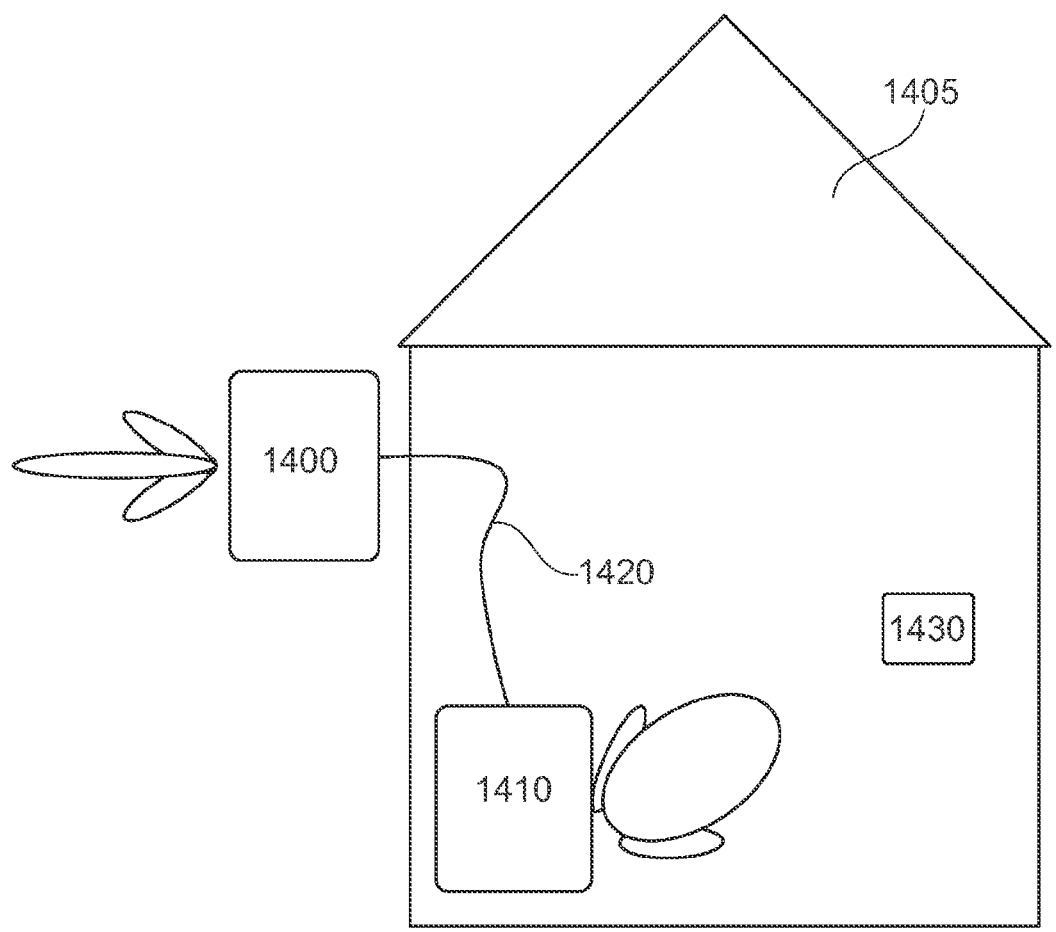
Figure 15:
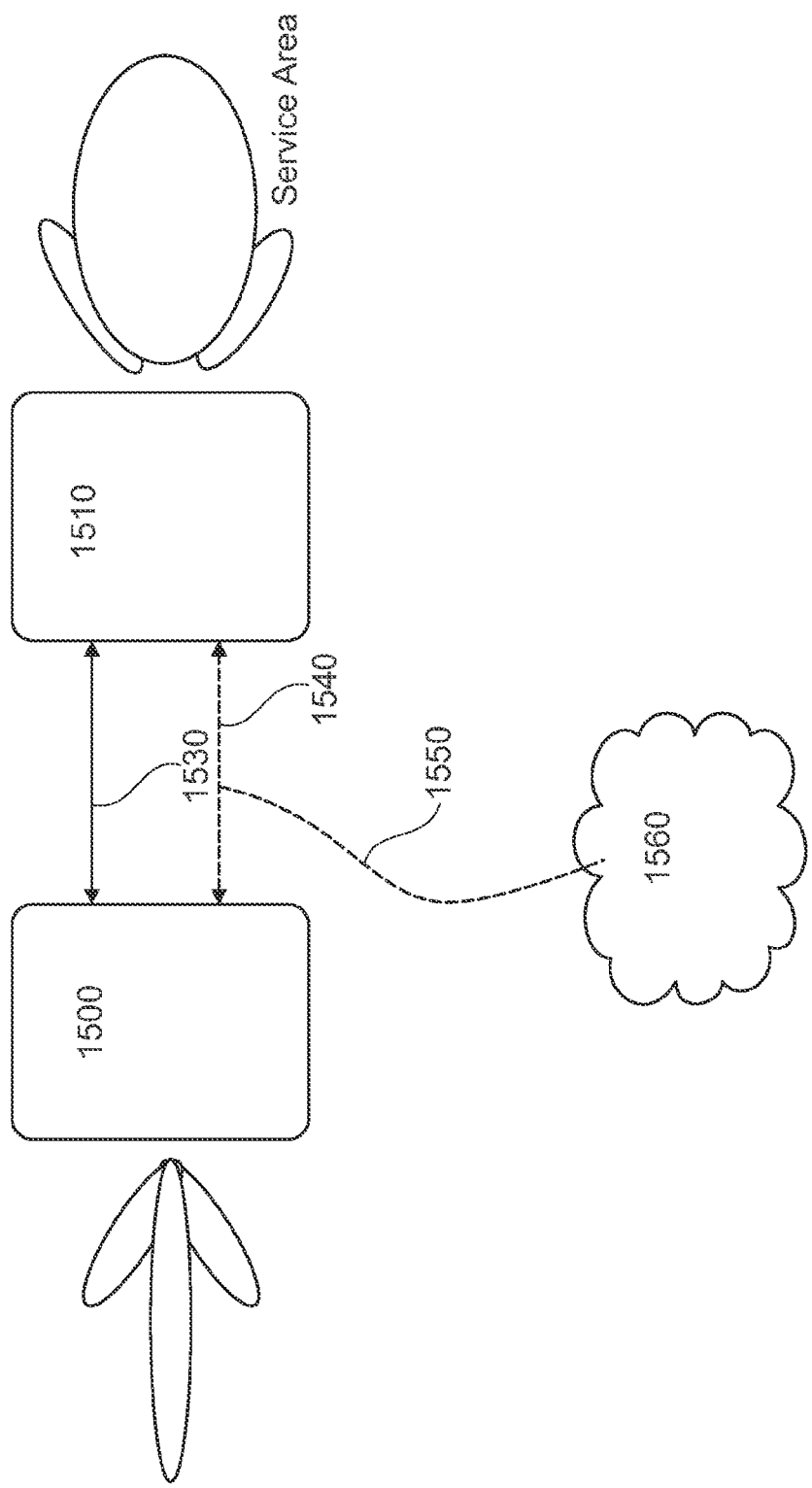

The invention will now be explained in more detail with reference to the figures. Showing:

FIG. 1 a first example of a prior art repeater system in an FDD implementation;

FIG. 2 a second example of a prior art repeater system in a TDD implementation;

FIG. 3 an explanation about the losses in coaxial lines;

FIG. 4A-4F several aspects of the repeater system;

FIGS. 5A-5C multiple aspects of the repeater system with a common cable;

FIG. 6 shows a repeater system with a common cable at two different intermediate frequencies;

FIG. 7 an application of the repeater system with multiple service antennas;

FIGS. 8A and 8B a sectorization of the transmission channels;

FIG. 9A a block diagram for a repeater h four service antennas;

FIG. 9B the modular structure of the repeater system;

FIG. 10 the modular structure of the repeater system;

FIG. 11A-11E several aspects for the bundling of the radio signals;

FIG. 12A-12E repeater system in the frequency domain;

FIG. 13 the control of the repeater system;

FIG. 14 the use of the repeater system in a building;

FIG. 15 the control of the repeater system.

Figure 4A:
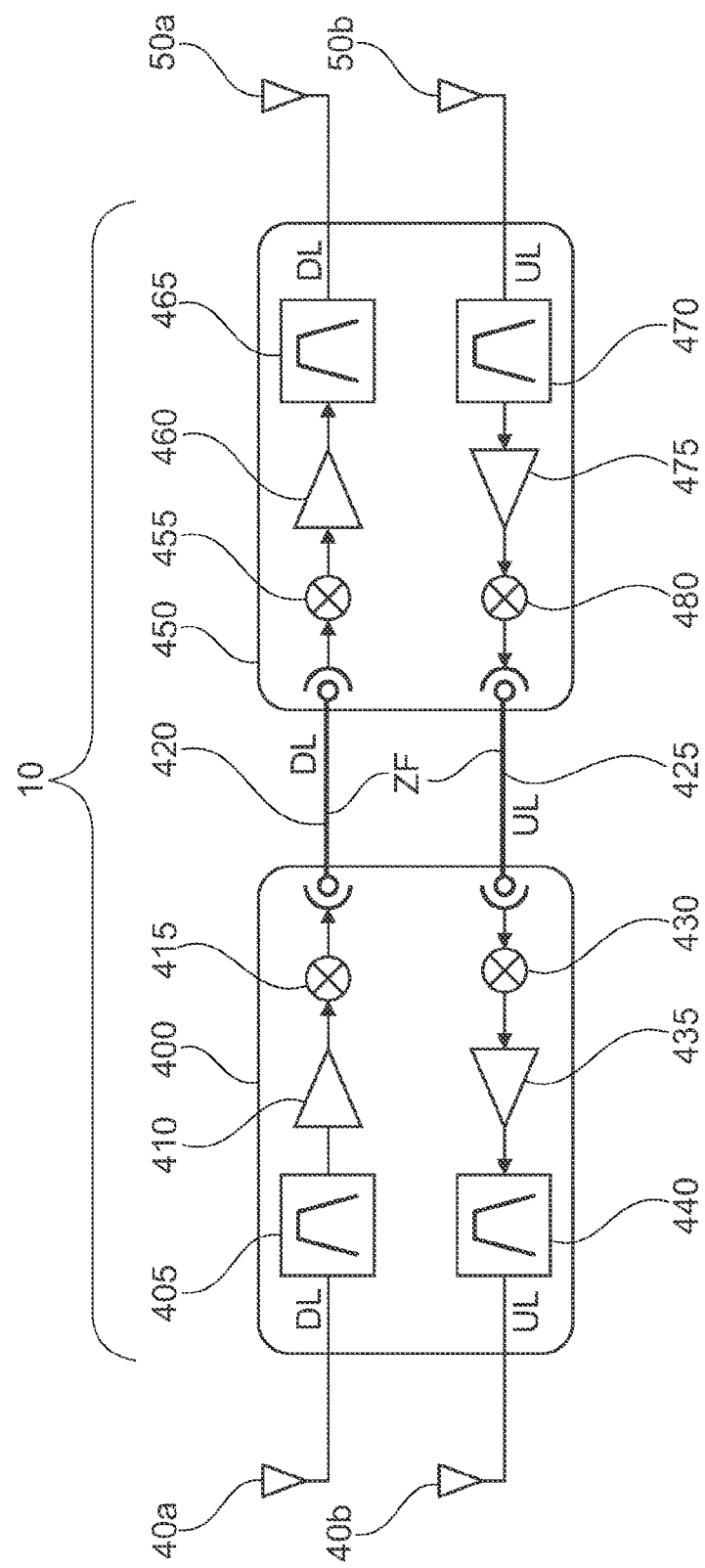

FIG. 4A illustrates a first aspect of the invention with a first frequency converter unit 400 and a second frequency converter unit 450 connected by two cables 420 and 425. The cables 420 and 425 are connected to the units 400 and 450 by plugs and connectors, and may also include other passive and active elements. The first frequency converter unit 400, which is further referred to as the donor unit 400, has a downlink donor antenna 40a for a downlink path DL and an uplink donor antenna 40b for an uplink path UL. The downlink path DL in the donor unit 400 comprises a donor downlink bandpass filter 405 associated with the donor antenna 40a that filters the received radio signals. A low-noise donor downlink amplifier 410 is connected to the output of the downlink bandpass filter 405 and amplifies the received signals in the filtered frequency range. The output of the low-noise donor downlink amplifier 410 is connected to a donor downlink mixing device 415. This donor downlink mixing device 415 is a frequency downconverter that converts the frequency of the received signals to a (low) intermediate frequency.

The uplink path UL in the donor unit 400 further comprises a donor uplink mixing device 430, a donor uplink power amplifier 435, and a donor uplink bandpass filter 440. The uplink path UL receives the signals transmitted from the second frequency converter unit 450, which is further referred to as the service unit 450. The donor uplink mixing device 430 is an upconverter and converts the frequency of the received signals from the intermediate frequency ZF to the transmission frequency. The signals are then amplified in the donor uplink power amplifier 435 and filtered in the donor uplink bandpass filter 440. The output of the donor uplink bandpass filter 440 is connected to the second donor antenna 40b and the filtered signals are transmitted at the transmission frequency.

The service unit 450 comprises, in the downlink path DL, a service downlink mixing device 455 connected to the input of a service downlink power amplifier 460. The service downlink mixing device 455 is an upconverter that converts the signals to be transmitted from the donor unit 400 from the intermediate frequency to the transmission frequency. The service downlink power amplifier 460 amplifies the signals. The output of the service downlink power amplifier 460 is connected to the input of a service downlink bandpass filter 465 that filters the signals. The output of the service downlink bandpass filter 465 is connected to the downlink service antenna 50a, and the downlink service antenna 50a radiates the signals at the transmission frequency.

The uplink path of the service unit 450 is connected to the uplink service antenna 50*b*, which is connected to the input of a service uplink bandpass filter 470. This service uplink bandpass filter 470 filters the received radio signals in a certain frequency range and forwards only these filtered radio signals to a low-noise service uplink amplifier 475, where the radio signals are amplified. The amplified signals from the low-noise service uplink amplifier 475 are passed to a service uplink mixing device 480, where they are converted to an intermediate frequency for transmission to the donor unit 400 via the cable 425 (a coaxial line).

In the donor unit 400, the received signals are forwarded on the uplink path to a donor uplink mixing device 430 and upconverted to the transmission frequency for transmission, as described above.

By converting the frequencies between the donor unit 400 and the service unit 450 to a lower intermediate frequency ZF, it is possible to use longer coaxial lines for cables 420 and 425. This means that the donor unit 400 and the service unit 450 can be operated at a distance from each other.

Figure 4B:
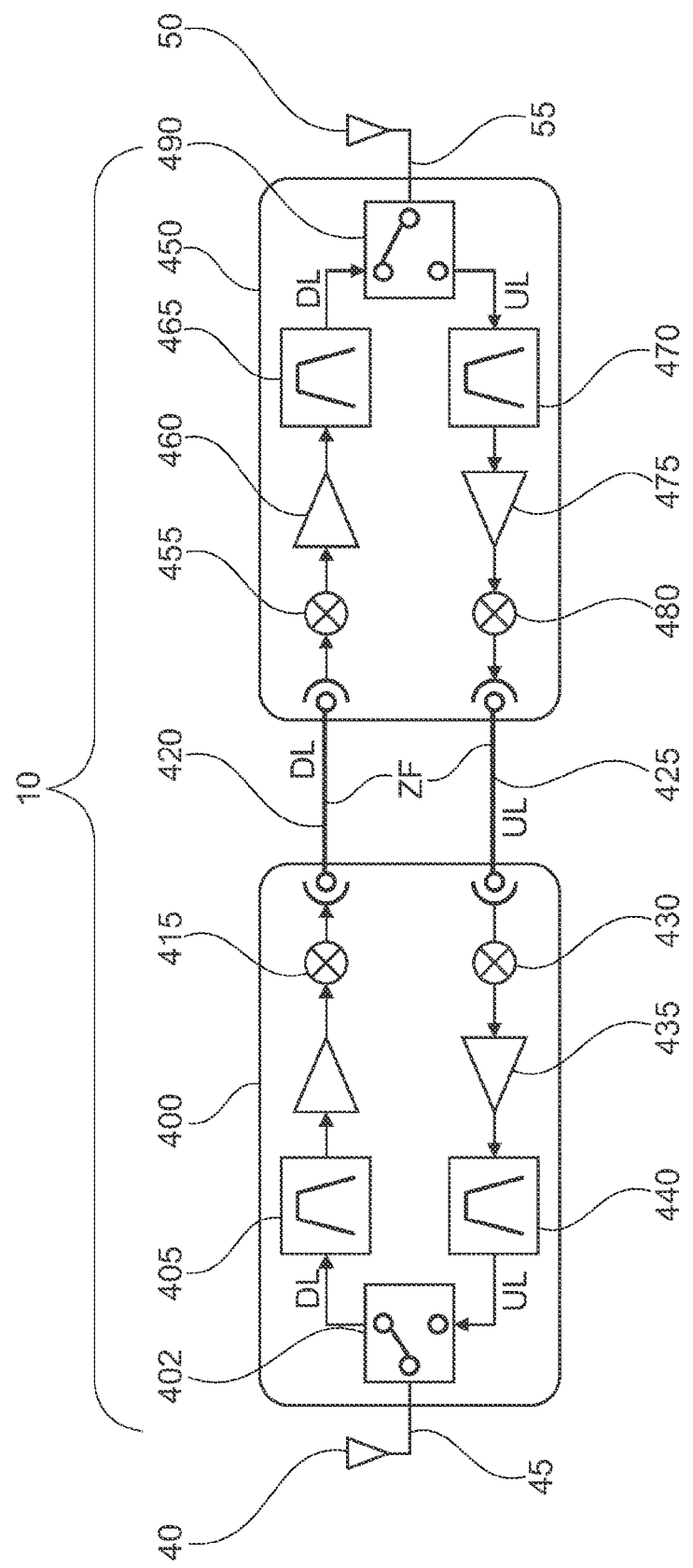

FIG. 4B illustrates an aspect of the repeater system 10 in which identical elements are present in the donor unit 400 and the service unit 450. These identical elements are identified by the same reference signs.

The aspect illustrated in FIG. 4B differs from the aspect of FIG. 4A in having a single donor antenna 40 instead of two donor antennas 40*a* and 40*b*, and a single service antenna 50 instead of two service antennas 50*a* and 50*b*. The single donor antenna 40 is connected to the donor unit 400 and the single service antenna 50 is connected to the service unit 450.

The donor unit 400 has a donor switch 402 connected to the single donor antenna 40 and to both the downlink path DL and the uplink path UL. The donor switch 402 is used to switch the donor antenna 40 between the downlink path DL and the uplink path UL, depending on whether signals are received or transmitted through the donor antenna 40. Similarly, a service switch 490 is provided in the service unit 450. This service switch 490 is also connected to the downlink path DL and to the uplink path UL of the service unit 450 and connected to the single service antenna 50. The service switch 490 can switch the signals to and from the service antenna 50 between the two paths (downlink path DL and uplink path UL).

In a third aspect of the invention (FIG. 4C), the donor downlink bandpass filter 405 and the donor uplink bandpass filter 440 are replaced with a single donor bandpass filter 405/440, and the donor switch 402 known from FIG. 4B is relocated behind the common bandpass filter 405/440. Also, in the service unit 450, the service downlink bandpass filter 465 and the service uplink bandpass filter 470 are replaced by a common service bandpass filter 465/470, and the service switch 490 known from FIG. 4B has been relocated between the common service bandpass filter 465/470 and the service downlink power amplifier 460 and the low-noise service uplink amplifier 475.

Figure 4C:
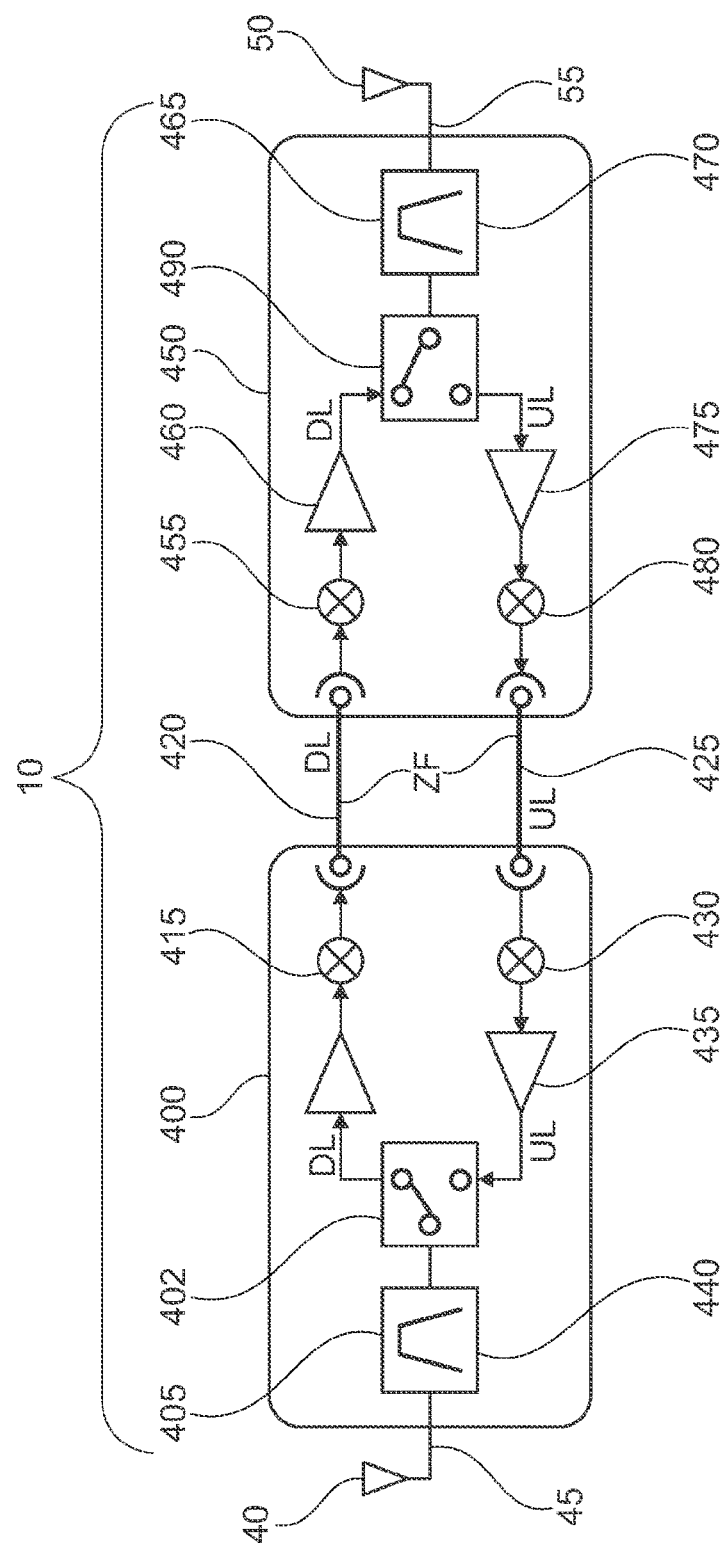
Figure 4D:
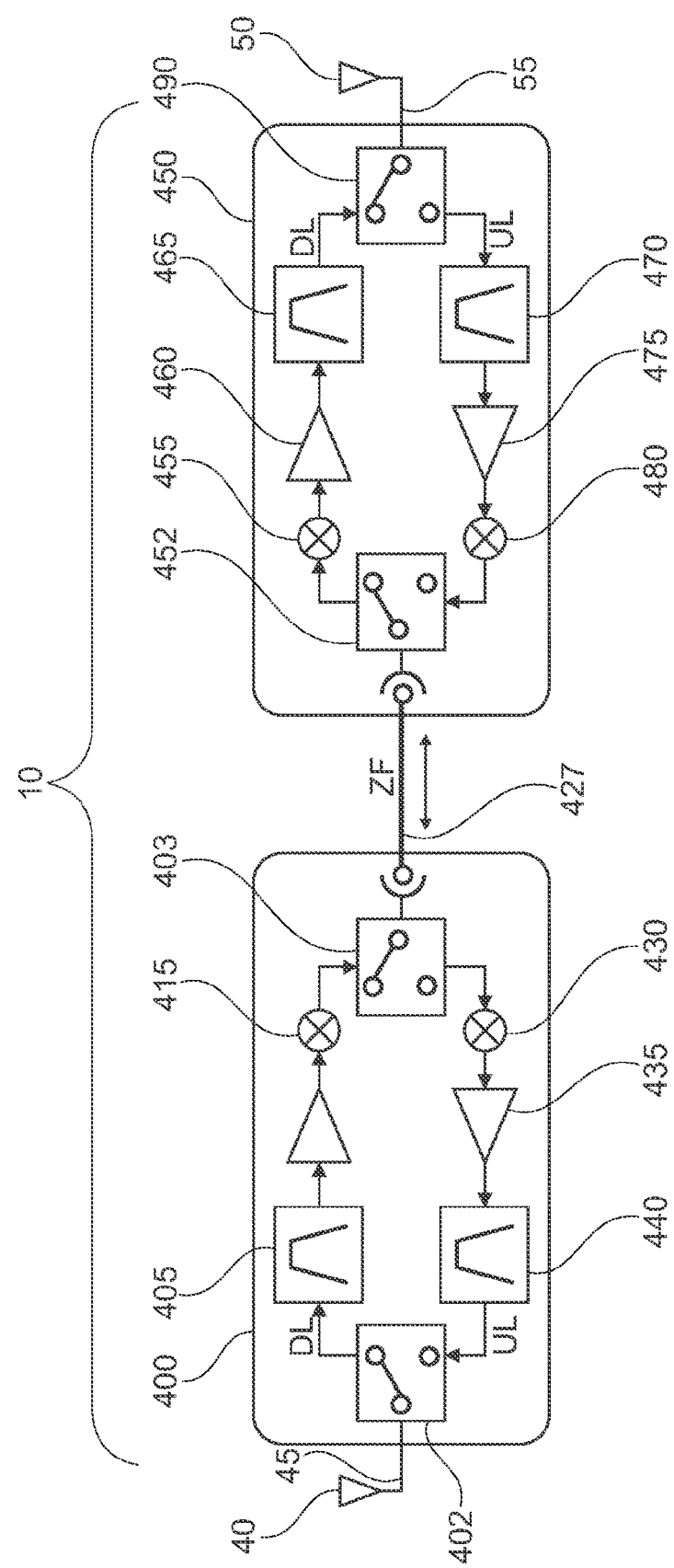

A fourth aspect of the repeater system 10 is shown in FIG. 4D. In this aspect of the invention, the two cables 420, 425 have been replaced by a common cable 427 (also a coaxial line). Therefore, as can be seen from FIG. 4D, the donor unit 400 requires a donor output switch 403 to switch the radio signals between the common cable 427 and the donor downlink mixing device 415 and the donor uplink mixing device 430. Also provided in the service unit 450 is a service input switch 452. This service input switch 452 is also connected to the service downlink mixing device 455 in the downlink path DL and to the service uplink mixing device 480 in the uplink path UL of the service unit 450, and switches the radio signals to the common cable 427.

Figure 4E:
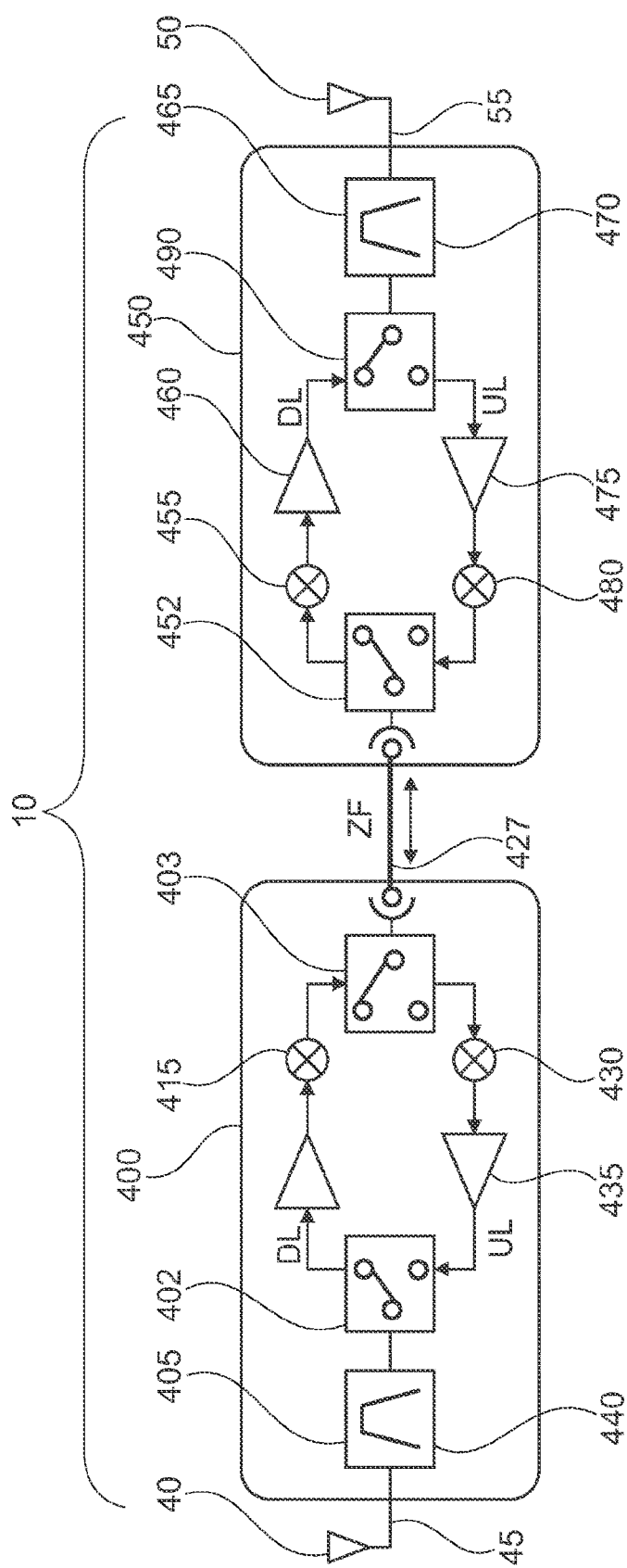

A fifth aspect of the repeater system 10 is illustrated in FIG. 4E. As can be seen from FIG. 4E, the common cable 427 is provided between the donor unit 400 and the service unit 450. It can also be seen that the donor switch 402 and the service switch 490 are present in positions as in the aspect illustrated in FIG. 4C.

Figure 4F:
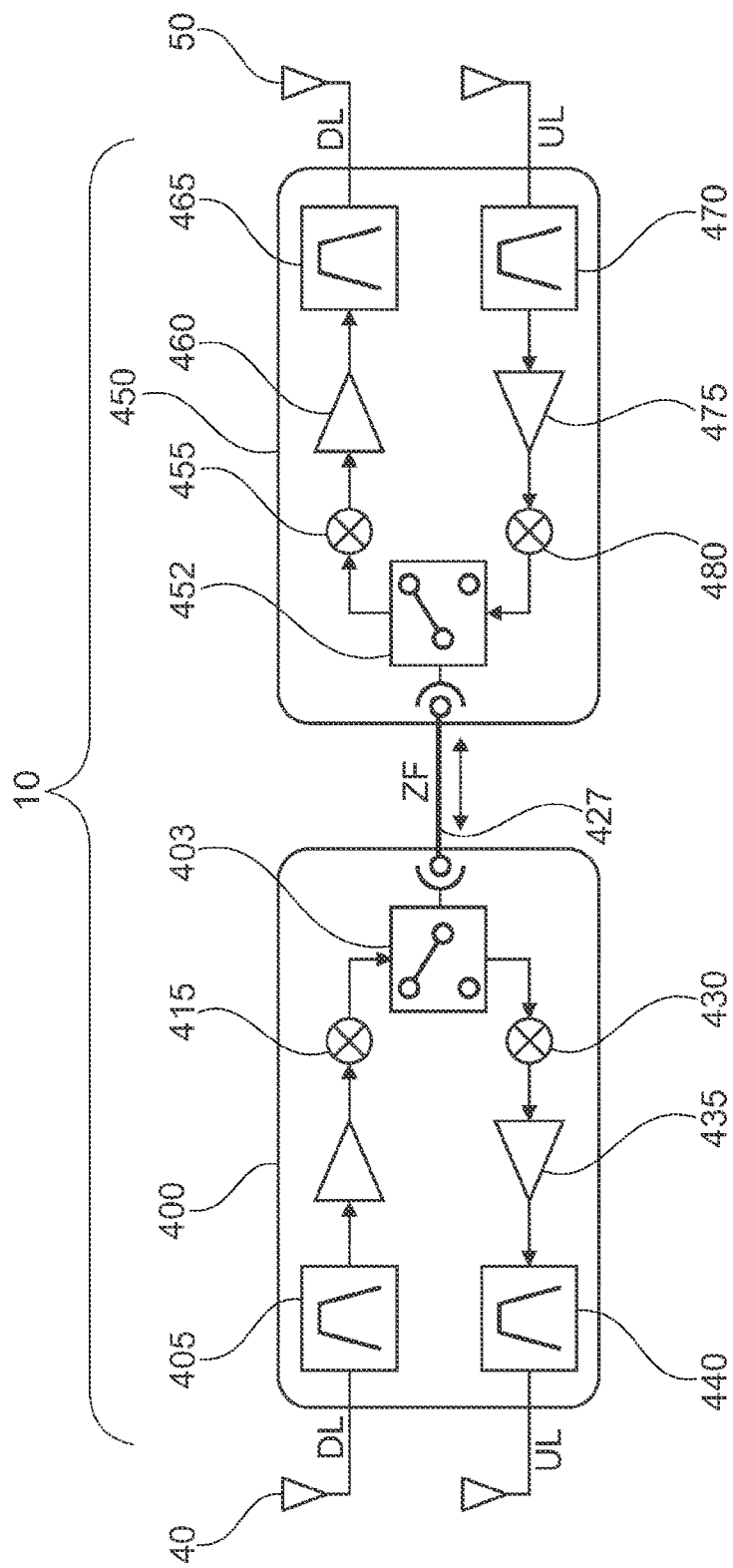

Another aspect of the invention can be seen in FIG. 4F. In the aspect of FIG. 4F, a common cable 427 is also provided between the donor unit 400 and the service unit 450. This aspect otherwise corresponds to the first aspect of the invention (FIG. 4A) with the two donor antennas 40*a* and 40*b* and the two service antennas 50*a* and 50*b*. Of course, this aspect of the invention requires the donor output switch 403 and the service input switch 452 to switch the radio signals to the common cable 427 at the intermediate frequency ZF.

Another aspect of the invention is illustrated in FIG. 5A. This aspect of the invention is substantially the same as earlier aspects of the invention, except that this aspect differs in that the common cable 427 transmits signals at two different frequencies ZF1 and ZF2. For example, the radio signals on the downlink path DL between the donor unit 400 and the service unit 450 are transmitted at a first intermediate frequency ZF1 via the common cable 427, and the radio signals on the downlink path DL between the service unit 450 and the donor unit 400 are transmitted at a second frequency ZF2. A donor duplexer 500 is provided in the donor unit 400, which redirects the radio signals to the corresponding path. There is also a service duplexer 510 in the service unit 450 whose function is to redirect the radio signals to the corresponding paths in the uplink (UL) and in the downlink (DL).

FIG. 5B illustrates a similar aspect of the repeater system 10, wherein the two donor antennas 40*a* and 40*b* of the repeater system 10 of FIG. 5A are replaced by a single donor antenna 40. Accordingly, the first donor unit 400 also includes a donor switch 402. The two service antennas 50*a* and 50*b* of FIG. 5A are also replaced with a common service antenna 50 in the aspect of FIG. 5B, and likewise a service switch 490 is provided in the service unit 450.

In FIG. 5C, the donor switch 402 is relocated in the donor unit 400, as is known from the aspect shown in FIGS. 4C and 4E. Likewise, the donor switch 490 is advanced in the service unit 450.

FIG. 6 shows another aspect of the invention with a common cable 427 transmitting radio signals at two different frequencies ZF1 and ZF2. As can be seen from the figures, the donor unit 400 includes two downlink paths DL and two uplink paths UL each with a mixing device 600*a*, 600*b*, 610*a*, 610*b*. The mixing devices 600*a*, 600*b*, 610*a*, 610*b* can convert the frequency of the radio signals to either the intermediate frequency ZF1 or the intermediate frequency ZF2, and these are forwarded to the service unit 450, in which the radio signals are converted back to the transmission frequency. Likewise, the service unit 450 includes two downlink paths DL and two uplink paths UL, each with a mixing device 650*a*, 650*b*, 660*a*, 660*b*. The other elements are known from FIGS. 4A-4F and 5A-5D.

An application of the repeater system 10 of the present document is shown in FIG. 7. In this FIG. 7, a plurality of service units 450-1, 450-2, 450-3, and 450-4 are shown, each connected to a service antenna 50-1, 50-2, 50-3, and 50-4, respectively. The plurality of service units 450-1, 450-2, 450-3 and 450-4 are connected via coaxial lines 720-1, 720-2, 720-3, and 720-4 to a splitter 700, which splits and forwards the radio signals from the donor unit 400 to the plurality of service units 450-1, 450-2, 450-3, and 450-4. The splitter 700 is connected to the donor unit 400 via a cable 710. This aspect of the invention, illustrated in FIG. 7, has the advantage that different radiation characteristics for the radio signals can be used for the plurality of service units 450-1, 450-2, 450-3, and 450-4.

FIG. 8A shows an example of these radiation characteristics in which the donor antenna 40 receives radio signals in four different frequency ranges f1, f2, f3, and f4 from the base station (not shown) and, via a repeater system 10 known from FIG. 7, radiates the received radio signals in four different directions in all of the received frequency ranges f1, f2, f3, and f4 in a "cube" type of manner via the four different service antennas 50a-d. Each service antenna 50a-d radiates all four frequency ranges f1, 12, f3 and f4.

In contrast, FIG. 8B shows another variation of the radiation characteristics. In this FIG. 8B, each service antenna 50a-d radiates radio signals in only one frequency range f1, f2, f3, f4. In other words, the radio signals received via the donor antenna 40 are radiated in each of the four frequency ranges f1, f2, f3, and f4 in one direction at different frequency ranges f1, f2, f3, or f4 via the respective service antennas 50a-d. This repeater system can therefore be used to supply certain sectors (reception areas) with radio signals of a specific frequency; the radio signals in other sectors have a different frequency.

FIG. 9A shows a block diagram for implementing the repeater system 10 of FIG. 7 with a donor unit 400 connected to four different service units 450a-c via cable 427a-c. As can be seen from FIG. 9A, the donor unit 400 is connected to a signal selector 900. The signal selector 900 includes four bandpass filters, each of which selects only the radio signals from one of four intermediate frequencies ZF1, ZF2, ZF3, and ZF4, and transmits these selected radio signals to a corresponding service unit 450-1, 450-2, 450-3, and 450-4.

FIG. 9B shows the modular structure of the repeater system 10. As can be seen from the figure, the donor antenna with bandpass filter 940 is separated from the electronics module 960 in the donor unit 400. The service units 450 are also separated into modules. The electronics modules 960a, 960b, 960c and 960d are similarly structured and are separated from the service antennas 50 with bandpass filters 950a, 950b, 950c and 950d. This modular design is also shown in simple form in FIG. 10.

FIGS. 11A-11E illustrate the use of the repeater system 10 for bundling the radio signals on the service side. The radio signals are received by the donor unit 400 via a line 1110 and distributed or reshaped in a distribution network 1120 or beamforming network (also referred to as lobe forming network) and passed to the service antennas 50. Through this distribution, different radiation characteristics of the service antennas 50 can be created. For example, FIG. 11 shows a simple radiation characteristic with one main lobe 1130 and two side lobes 1135.

Figure 11A:
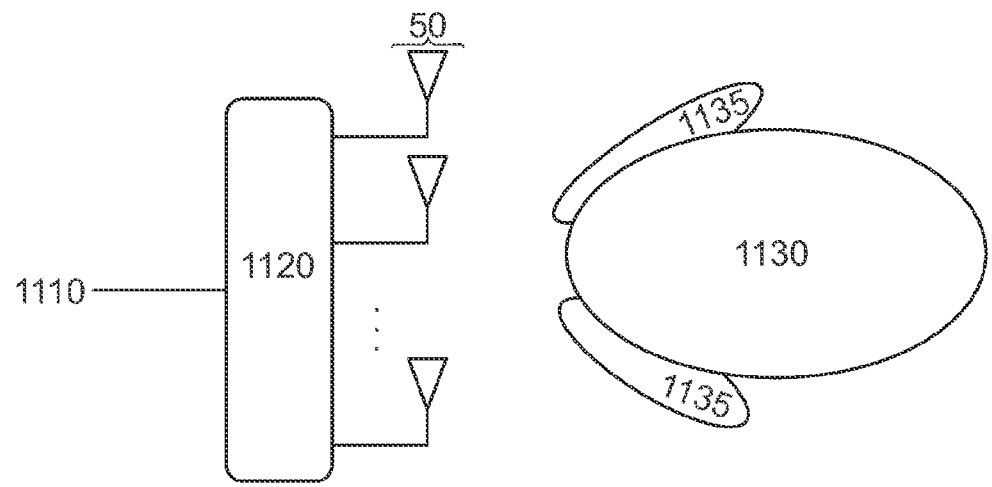
Figure 11B:
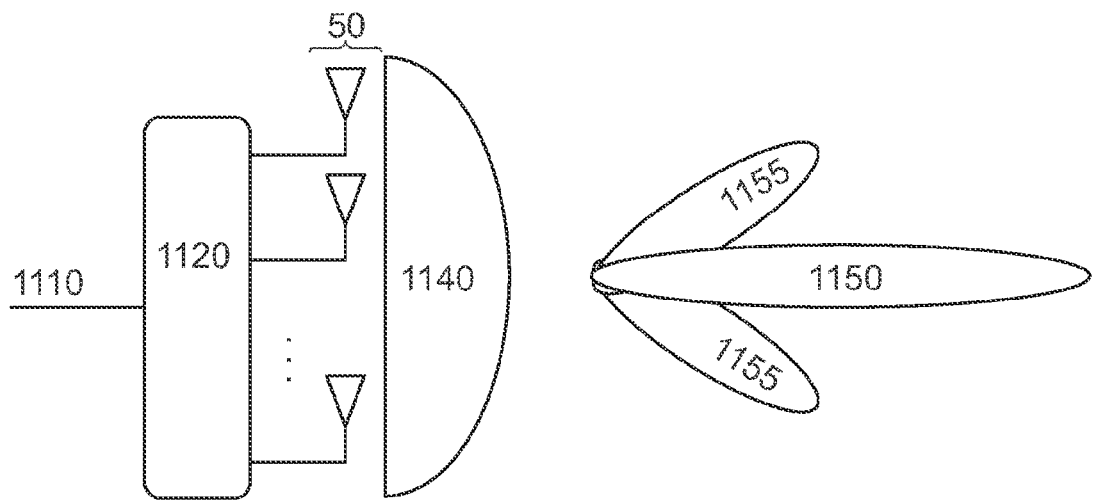
Figure 11C:
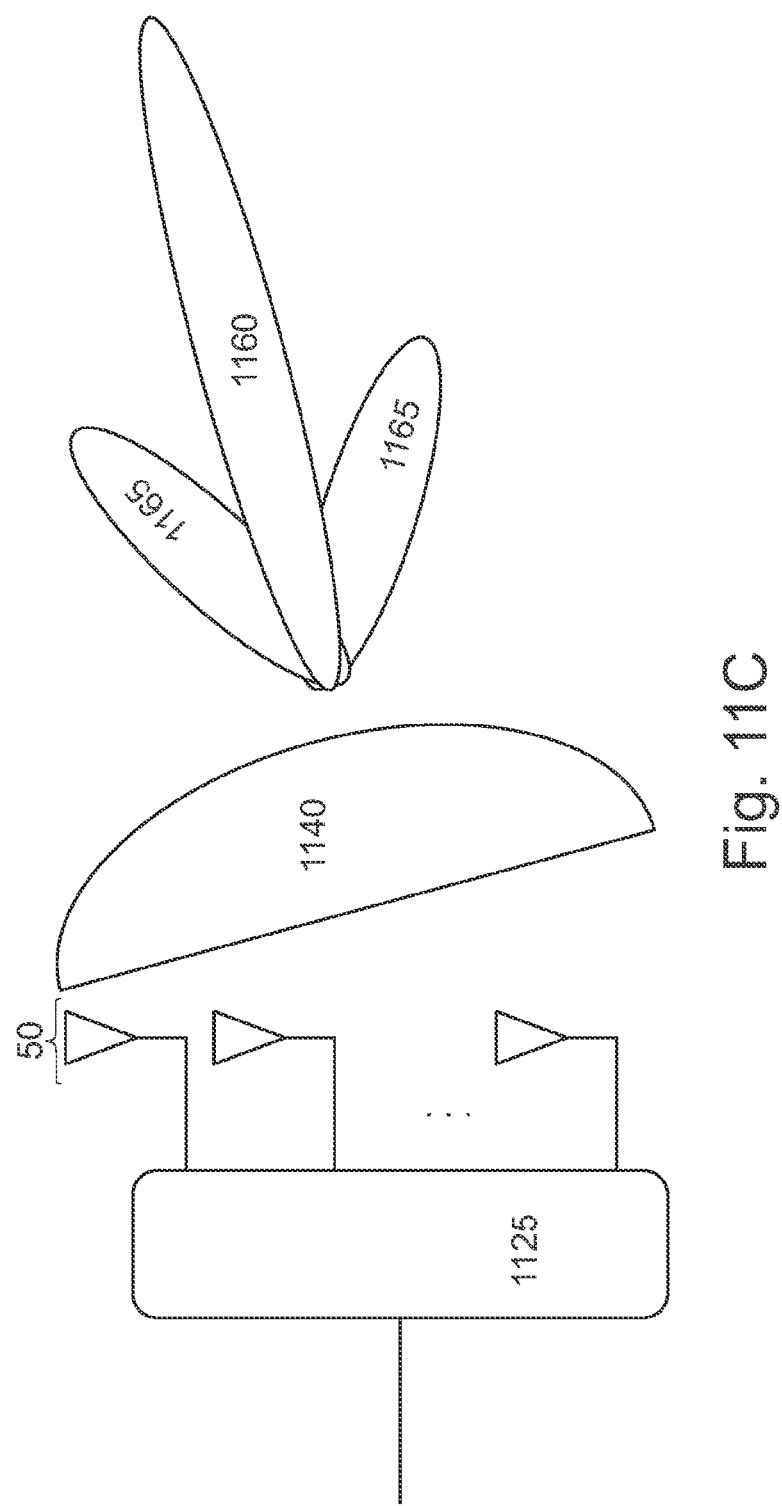
Figure 11D:
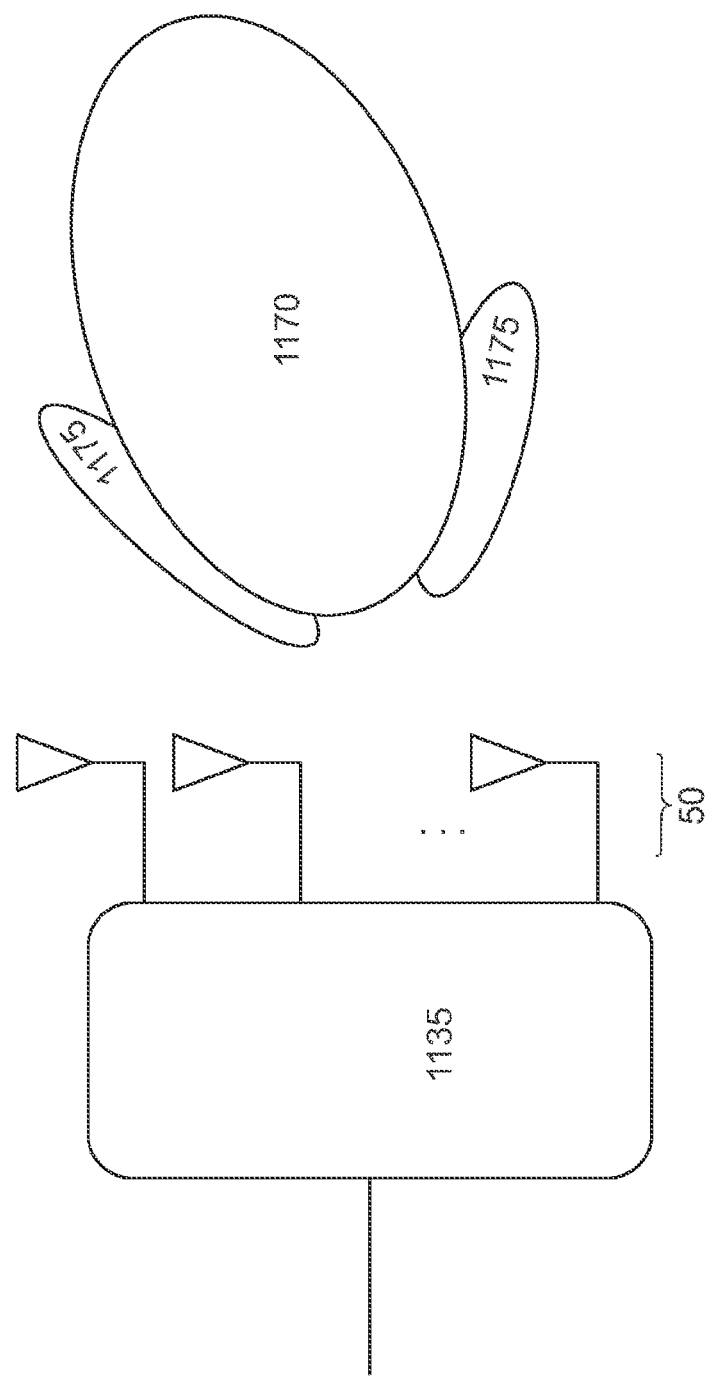
Figure 11E:
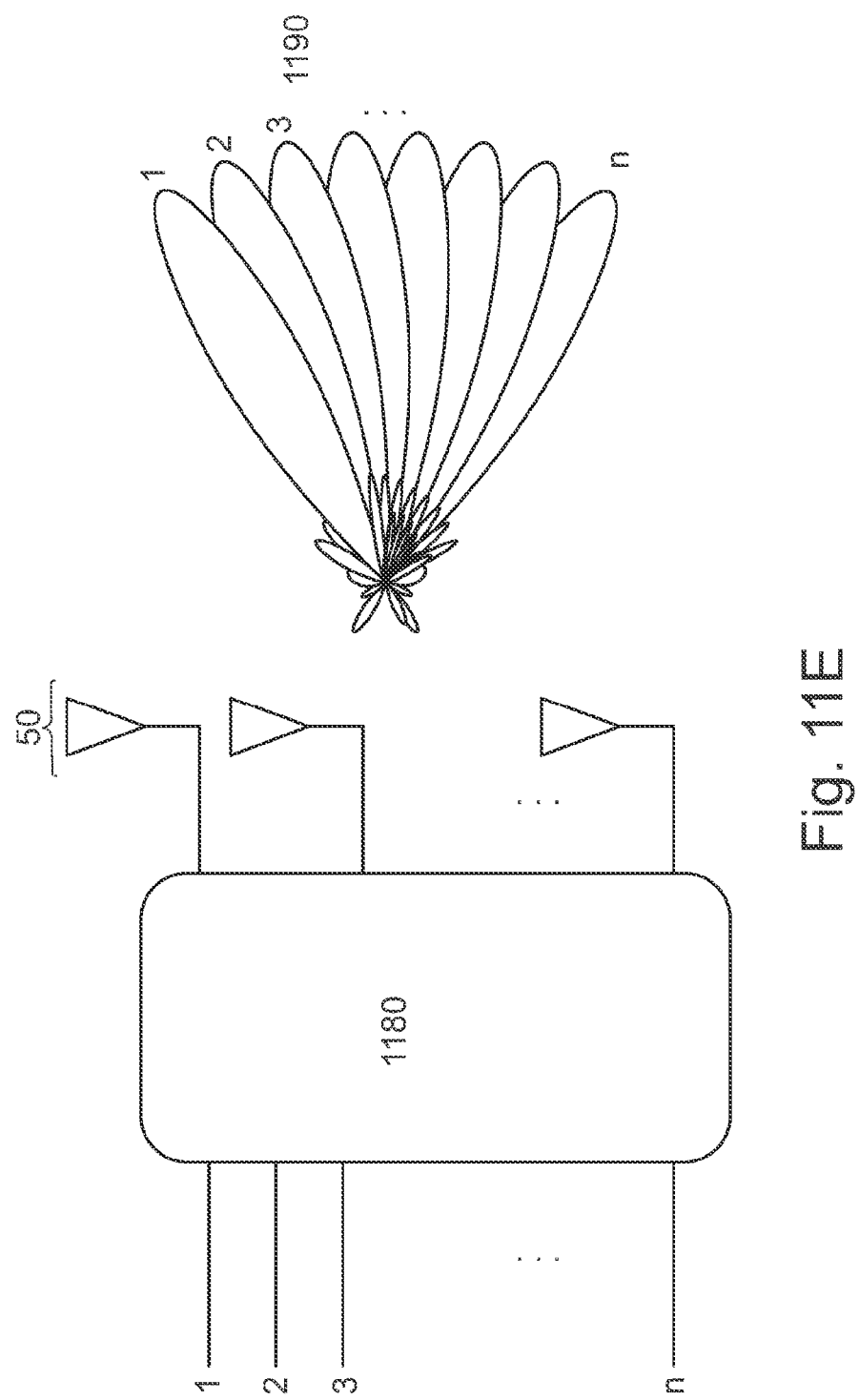

The use of dielectric lens 1140 is shown in FIG. 11B. This results in a very strong main lobe 1150 with side lobes 1155. In FIG. 11C, a beamforming network is shown with a dielectric lens 1140 that also has a radiation characteristic with a strong main lobe 1160 and side lobes 1165 that is pivoted in this aspect of the invention. The pivoting of the main lobe 1170 with side lobes 1175 of the radio signals by the beamforming network 1125 is well known and is shown in FIG. 11D. In another aspect of the invention, a Rotmann lens 1180 is used as a distribution network. This allows the radio signals to be bundled in a plurality of beam directions 1190.

Figure 12A:
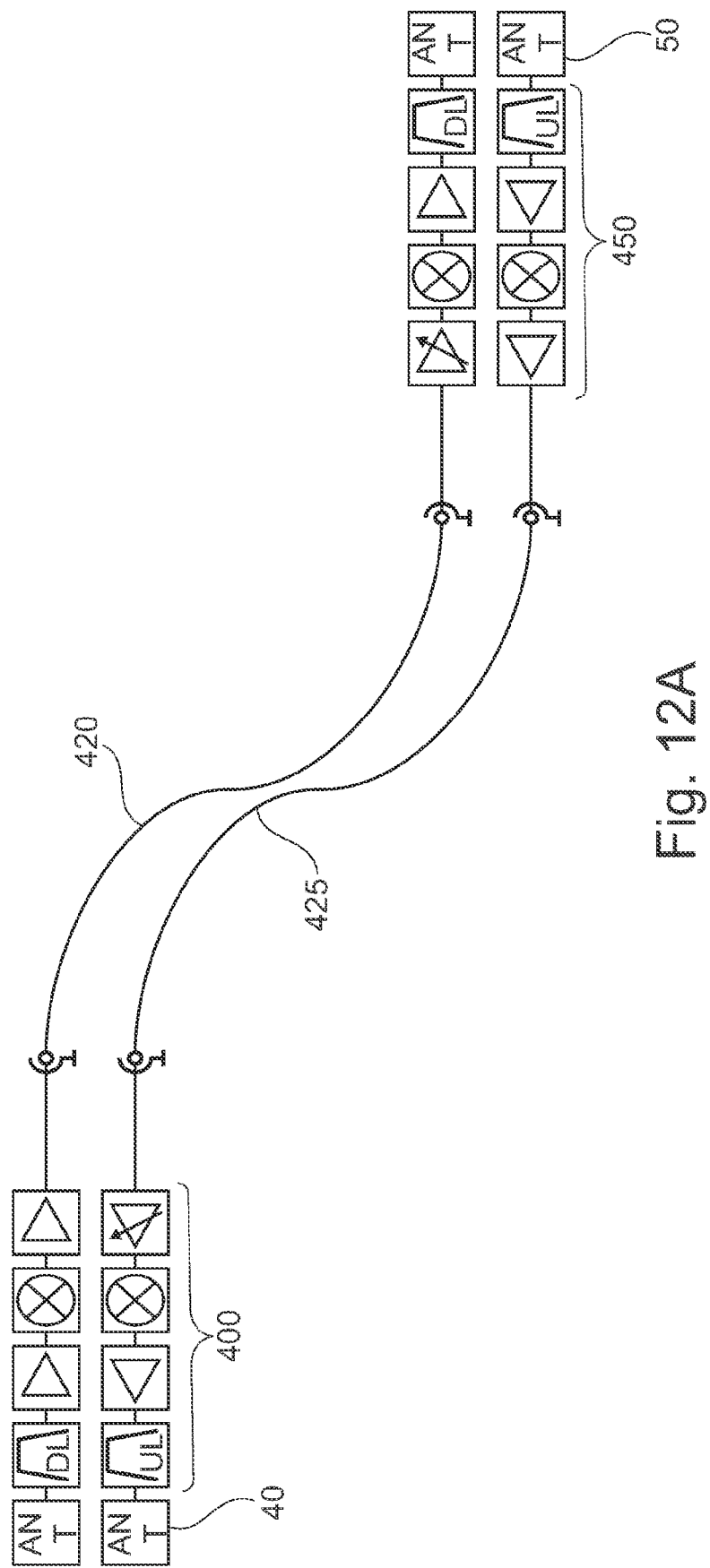
Figure 12B:
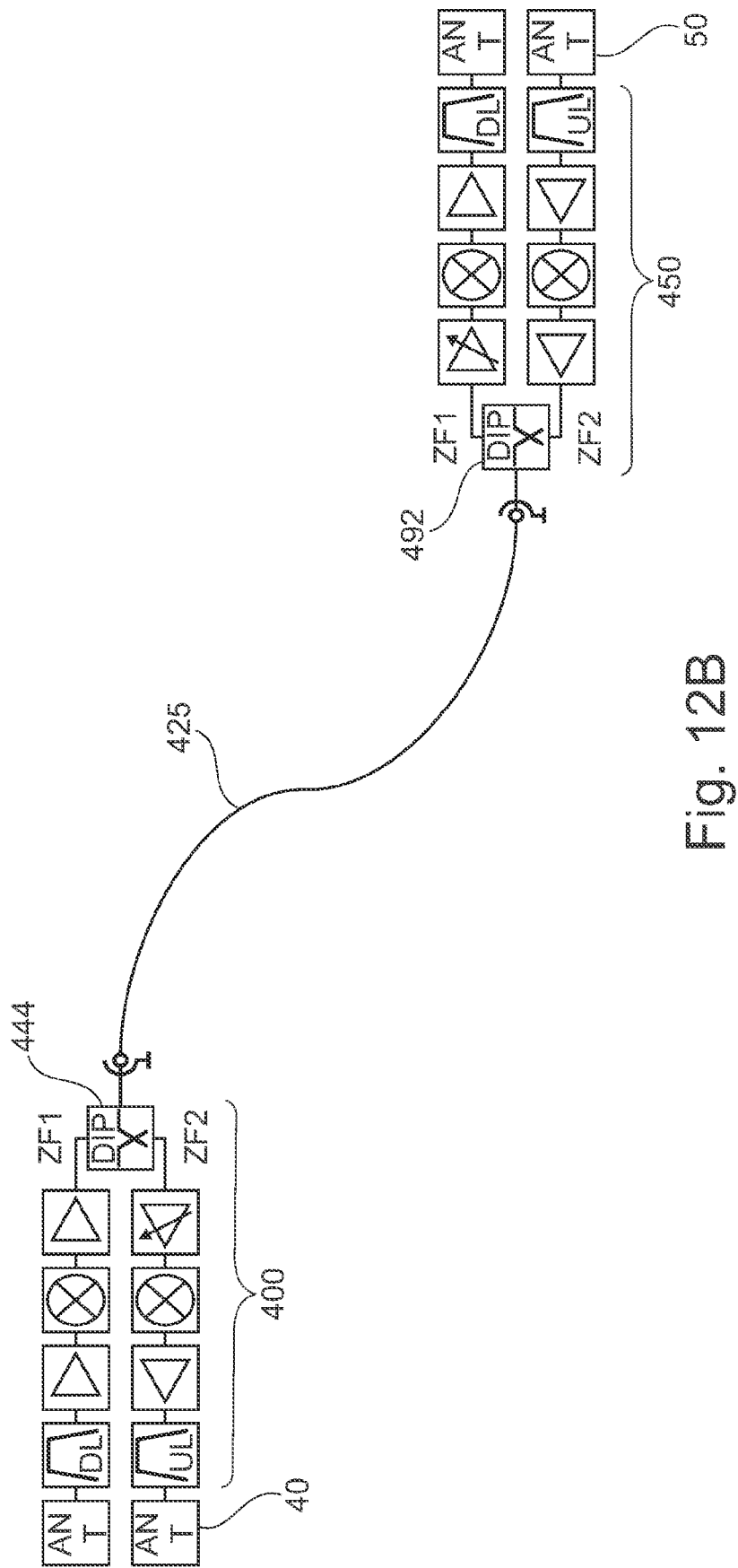
Figure 12C:
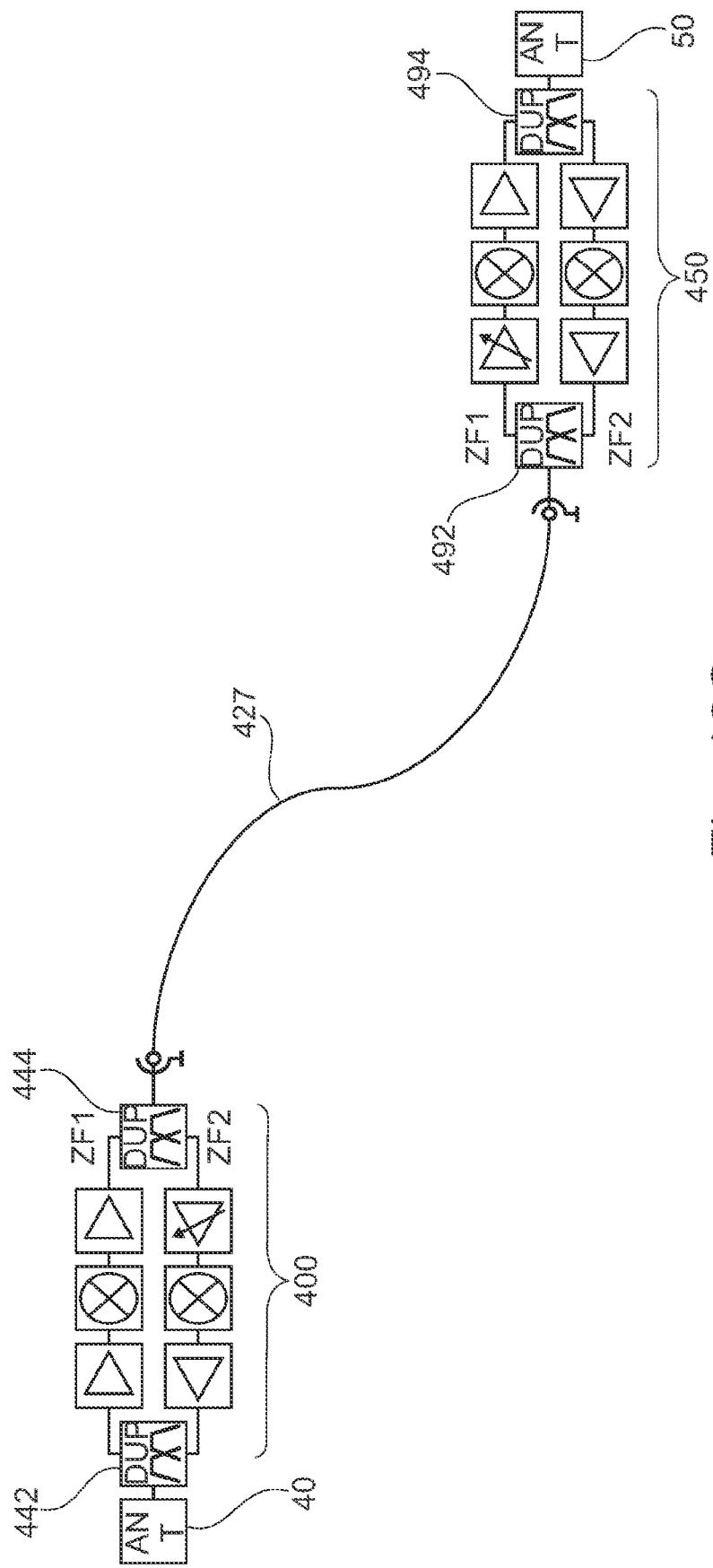
Figure 12D:
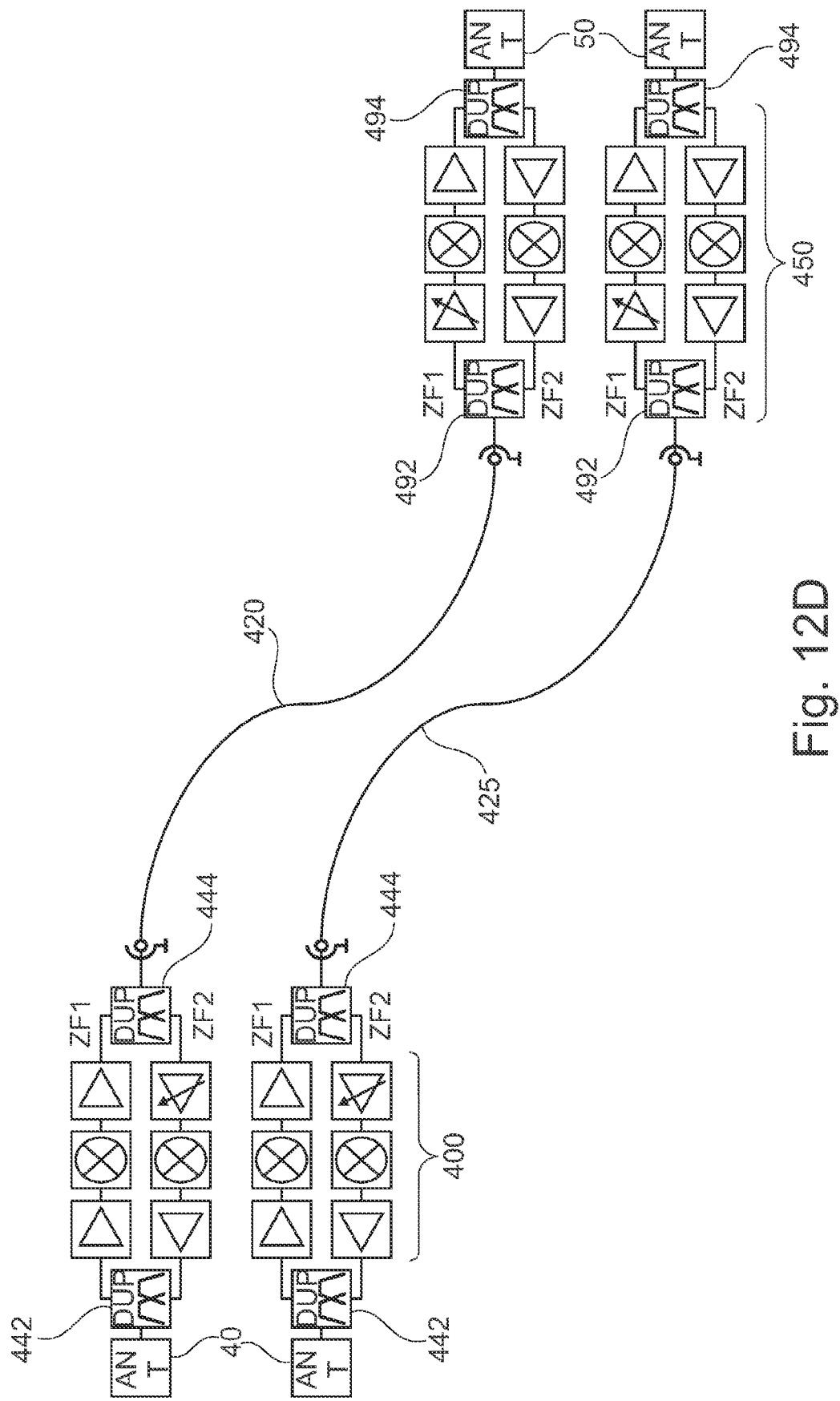
Figure 12E:
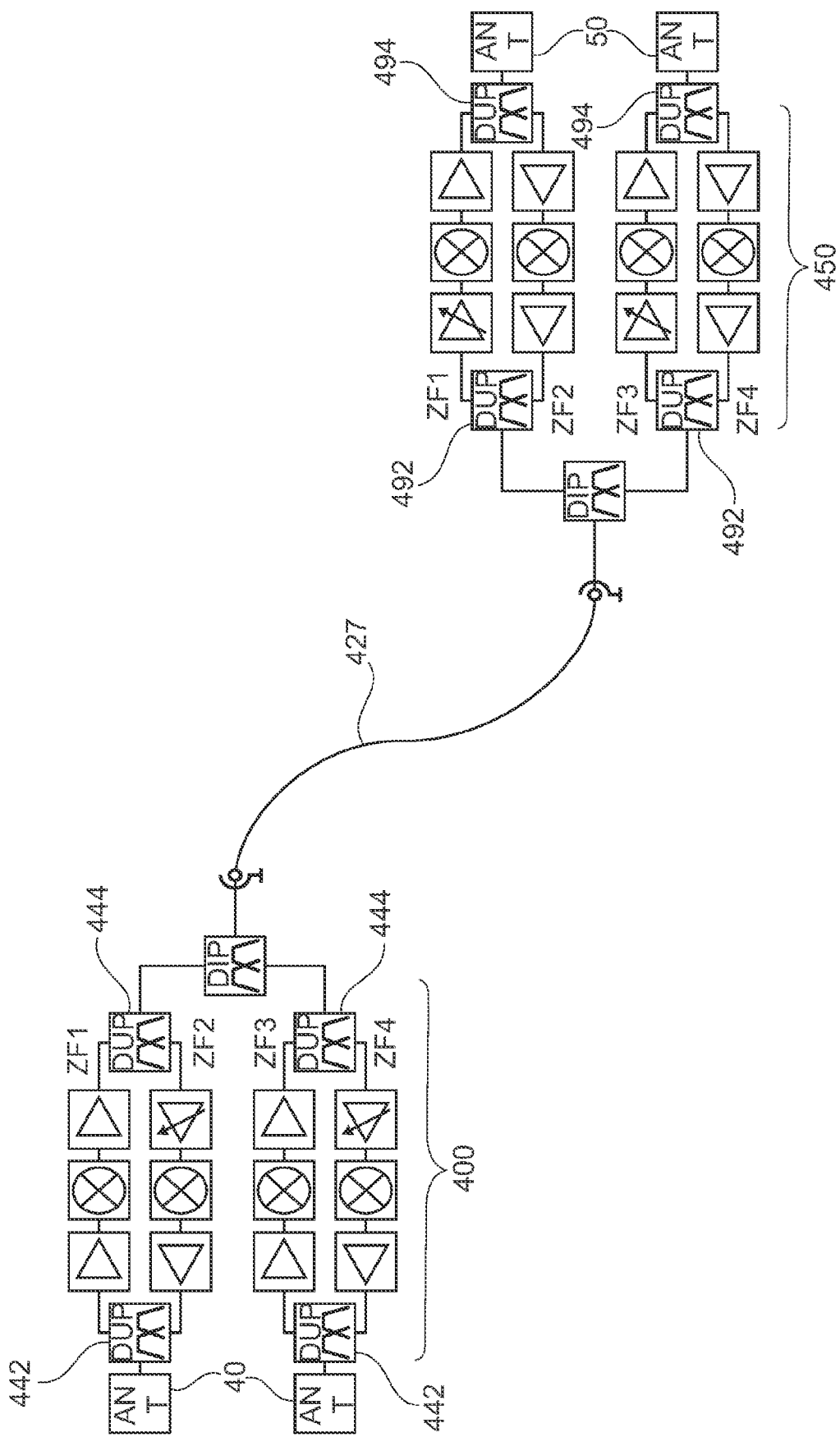

The invention can also be used for repeater systems 10 with frequency division duplex (FDD), as can be seen from FIGS. 12A-12E. The structure of the respective figures is similar to that for repeater systems 10 with time division duplex (TDD). FIG. 12A shows the transmission of radio signals between the donor unit 400 and the service unit 450. FIG. 12B shows a common transmission of the radio signals together on the common cable 427 with two different intermediate frequencies in ZF1 and ZF2 with a duplexer 444 in the donor unit 400 and a duplexer 492 in the service unit 450. FIG. 12C shows the use of a single donor antenna 40 and a single service antenna 50 by combining the uplink and downlink signals at the donor antenna 40 with a duplexer 442 and combining the uplink and downlink signals at the service antenna 50 with a duplexer 494. FIG. 12D shows the repeater system of FIG. 12C with two different transmission paths, and FIG. 12E shows how the common cable 427 can be used at the donor unit 400 and at the service unit 450 by using different intermediate frequencies ZF1, ZF2, ZF3, and ZF4. Additional donor units 400 and service units 450 may be added.

In FIG. 13, it is shown that the control of the repeater system 10 can be controlled externally via an IT network 1310 using a so-called IoT modem 1300.

For example, one application of the repeater system 10 of this document is shown in FIG. 14 and is in a building 1405 that is already wired with coaxial lines 1420. These already existing coaxial lines may be reused with the aid of the repeater system 10 of the present document. In this case, the intermediate frequency ZF is selected so that the signals on the existing coaxial line 1420 are not interfered with by the radio signal transmitted between the donor unit 1400 and the service unit 1410. This allows mobile stations (user equipment) 1430 to be provided with radio signals in a building. FIG. 15 illustrates another aspect of the repeater system 10 of the present document. At least one transmission path (e.g., 1530) via, e.g. lines 1540 between the donor unit 1500 and the service unit 1510 can have additional control signals applied to them and, for example, transmit data from or to the IT network 1560 via an additional transmission path 1550.

REFERENCE SIGNS

10 Repeater
20 Base station
30 Mobile station
40 Donor antenna
40a Downlink donor antenna
40b Uplink donor antenna
45 Coaxial line
50 Service antenna
50a Downlink service antenna
50b Uplink service antenna
55 Coaxial line
100 First duplexer
105 First switch
110 Downlink amplifier
120 Downlink bandpass filter
130 Downlink power amplifier
150 Second duplexer
155 Second switch
160 Uplink amplifier
170 Uplink bandpass filter 180 Uplink power amplifier
400 First frequency converter unit/donor unit
402 Donor switch
403 Donor output switch
405 Donor downlink bandpass filter
410 Donor downlink amplifier
415 Donor downlink mixing device
420 Cable
425 Cable
427 Common cable
430 Donor uplink mixing device
435 Donor uplink power amplifier
440 Donor uplink bandpass filter
442 Duplexer
444 Duplexer
450 Service unit
452 Service input switch
455 Service downlink mixing device
460 Service downlink power amplifier
465 Service downlink bandpass filter
470 Service uplink bandpass filter
475 Service uplink amplifier
480 Service uplink mixing device
490 Service switch
492 Duplexer
494 Duplexer
500 Donor duplexer
510 Service duplexer
600a,b Mixing device
610a,b Mixing device
650a,b Mixing device
660a,b Mixing device
700 Splitter
710 Cable
900 Signal selector
940 Donor antenna with bandpass filter
950 Service antenna with bandpass filter
960 Electronics module
1110 Line
1120 Distribution network
1125 Beamforming network
1130 Main lobe
1135 Side lobe
1140 Dielectric lens
1150 Main lobe
1155 Side lobe
1160 Main lobe
1165 Side lobe
1170 Main lobe
1180 Rotmann lens
1190 Radiation direction (beam)
1300 IoT Model
1310 ITG network
1400 Donor unit
1405 Building
1410 Service unit
1420 Coaxial lines
1430 User equipment
1500 Donor unit
1510 Service unit
1530 Transmission path
1540 Lines
1550 Additional transmission path
1560 IT network

The invention claimed is:

1. A repeater system for forwarding a radio signal, comprising:
a donor unit for converting a transmission frequency of the radio signal transmitted in a Time Division Duplexing, TDD, mode to a downlink intermediate frequency, IF, of a downlink IF signal;
a service unit for converting the downlink IF frequency of the downlink IF signal to the transmission frequency of the radio signal;
a donor downlink amplifier that is adjustable and a total amplification of the radio signal is adjusted by solely adjusting the donor downlink amplifier such that a sum of the total amplification between a donor downlink antenna and a service uplink antenna by the donor downlink amplifier is less than a decoupling between a donor uplink antenna and a service downlink antenna; and
at least one cable, connecting the donor unit to the service unit for transmitting the downlink IF signal over a distance between the donor unit and the service unit, wherein the donor unit comprises the donor uplink antenna and the donor downlink antenna and the service unit comprises the service uplink antenna and the service downlink antenna.

2. The repeater system according to claim 1, wherein the radio signal has a wavelength between about a centimeter and a millimeter.

3. The repeater system according to claim 1, wherein the donor unit comprises a donor uplink path and a separate donor downlink path, and the service unit comprises a service uplink path and a separate service downlink path.

4. The repeater system according to claim 1, comprising:
a plurality of service units including the service unit and a plurality of cables including the at least one cable, the plurality of cables connecting the donor unit to each of the plurality of service units and transmitting the downlink IF signal over the distance between the donor unit and the plurality of service units.

5. The repeater system according to claim 4, wherein the plurality of service units are adapted such that the plurality of service units radiate and receive signals in different directions.

6. The repeater system according to claim 5, wherein the plurality of service units are located at a location and radiate and receive in overlapping sectors.

7. The repeater system according to claim 4, wherein the plurality of service units, in operation, radiate and receive signals at different transmission frequencies.

8. The repeater system according to claim 1, wherein the donor unit comprises a donor uplink bandpass filter connected to the donor uplink antenna and a downlink bandpass filter connected to the donor downlink antenna for transmitting the radio signal.

9. The repeater system according to claim 8, wherein the donor unit comprises the donor uplink bandpass filter and the downlink bandpass filter, wherein the donor uplink bandpass filter and the downlink bandpass filter correspond to a same operating frequency.

10. The repeater system according to claim 1, wherein a separate donor downlink path comprises a donor downlink mixing device, wherein the donor downlink mixing device is connected to the at least one cable.

11. The repeater system according to claim 1, wherein a decoupling between the donor uplink antenna and donor downlink antenna is at least 60 dB.

12. The repeater system according to claim 1, wherein an amplifier of a downlink path in the donor unit and/or the service unit, at a time when no desired signal is passing through the amplifier, is switched off or reduced in amplification.

13. The repeater system according to claim 1, wherein the donor unit comprises a donor downlink power amplifier and the service unit comprises a service uplink power amplifier, wherein at a time when no desired signal is passing through the amplifier, the amplifier is switched off or reduced in amplification.

14. The repeater system according to claim 1, wherein the service unit further receives, via the service uplink antenna, an uplink transmission and converts an uplink transmission signal transmitted in the TDD mode to an uplink IF signal, wherein the donor unit receives the uplink IF signal and converts the uplink IF signal to an uplink radio frequency signal for transmission by the donor uplink antenna.

15. The repeater system according to claim 14, wherein the downlink IF signal and the uplink IF signal are passed between the donor unit and the service unit via the at least one cable.

16. The repeater system according to claim 14, wherein the downlink IF signal is passed between the donor unit and the service unit via the at least one cable and the uplink IF signal is passed between the donor unit and the service unit via a different cable.

17. A repeater system for forwarding radio signals in accordance with a Time Division Duplexing, TDD, mode of operation, the repeater system comprising:
 a donor unit comprising a donor uplink antenna and a separate donor downlink antenna;
 a service unit comprising a service uplink antenna and a separate service downlink antenna;
 a donor downlink amplifier that is adjustable and a total amplification of the radio signal is adjusted by solely adjusting the donor downlink amplifier such that a sum of the total amplification between a donor downlink antenna and a service uplink antenna by the donor downlink amplifier is less than a decoupling between the donor uplink antenna and the service downlink antenna; and
 at least one cable connecting the donor unit to the service unit over a distance between the donor unit and the service unit, wherein
 for a downlink radio signal to be repeated in accordance with the TDD mode of operation:
  (i) the donor unit is operable to receive the downlink radio signal via the donor downlink antenna and convert the downlink radio signal from a transmission frequency to a downlink intermediate frequency, IF, to thereby provide a downlink IF signal; and
  (ii) the service unit is operable to receive the downlink IF signal from the donor unit via the at least one cable and convert the downlink IF signal to the transmission frequency to thereby provide a repeated downlink radio signal to the service downlink antenna; and
 for an uplink radio signal to be repeated in accordance with the TDD mode of operation:
  (i) the service unit is operable to receive the uplink radio signal via the service uplink antenna and convert the uplink radio signal from the transmission frequency to an uplink IF to thereby provide an uplink IF signal; and
  (ii) the donor unit is operable to receive the uplink IF signal from the service unit via the at least one cable and convert the uplink IF signal to the transmission frequency to thereby provide a repeated uplink radio signal to the donor uplink antenna.

18. The repeater system according to claim 17, wherein the downlink IF signal and the uplink IF signal are passed between the donor unit and service unit via the at least one cable.

19. The repeater system according to claim 17, wherein the downlink IF signal is passed between the donor unit and service unit via the at least one cable and the uplink IF signal is passed between the donor unit and service unit via a different cable.

* * * * *